(12) United States Patent
Ito

(10) Patent No.: US 10,609,983 B2
(45) Date of Patent: Apr. 7, 2020

(54) VENTILATION SHOE

(71) Applicant: INFOM CO., LTD., Ichinomiya-shi, Aichi (JP)

(72) Inventor: Takayoshi Ito, Ichinomiya (JP)

(73) Assignee: INFOM CO., LTD, Ichinomiya-Shi, Aichi (JP)

( * ) Notice: Subject to any disclaimer, the term of this patent is extended or adjusted under 35 U.S.C. 154(b) by 0 days.

(21) Appl. No.: 16/089,967

(22) PCT Filed: Feb. 16, 2017

(86) PCT No.: PCT/JP2017/005754
§ 371 (c)(1),
(2) Date: Sep. 28, 2018

(87) PCT Pub. No.: WO2017/169251
PCT Pub. Date: Oct. 5, 2017

(65) Prior Publication Data
US 2019/0125027 A1 May 2, 2019

(30) Foreign Application Priority Data

Mar. 30, 2016 (JP) .................................. 2016-68753

(51) Int. Cl.
*A43B 7/08* (2006.01)
*A43B 13/20* (2006.01)
(Continued)

(52) U.S. Cl.
CPC ................ *A43B 7/081* (2013.01); *A43B 7/08* (2013.01); *A43B 7/088* (2013.01); *A43B 13/16* (2013.01);
(Continued)

(58) Field of Classification Search
CPC ............ A43B 7/081; A43B 7/082; A43B 7/08
See application file for complete search history.

(56) References Cited

U.S. PATENT DOCUMENTS

| 2006/0143943 A1* | 7/2006 | Cho | A43B 7/081 36/3 B |
| 2007/0068037 A1* | 3/2007 | Ridinger | A43B 7/081 36/3 B |

(Continued)

FOREIGN PATENT DOCUMENTS

| JP | S64-32604 | 3/1989 |
| JP | 2013-212348 A | 10/2013 |
| JP | 2014-200327 A | 10/2014 |

OTHER PUBLICATIONS

International Search Report from International Application No. PCT/JP2017/005754 dated Apr. 11, 2017.

*Primary Examiner* — Ted Kavanaugh
(74) *Attorney, Agent, or Firm* — Brundidge & Stanger, P.C.

(57) ABSTRACT

There is provided a ventilation shoe that allows for downsizing and enables a shoe interior to be sufficiently ventilated. The ventilation shoe comprises an upper (31), a sole (32) formed by layering a plurality of sole plates, and a ventilation device configured to take the air into a shoe interior (34) and release the air out of the shoe interior (34). The ventilation device comprises an air intake passage (L1) configured to take in the air, an air release passage (L2) configured to release the air, and a pump chamber (P) configured to feed the air taken in through the air intake passage (L1) to the air release passage (L2). The sole (32) is formed by layering a plurality of sole plates. The pump chamber (P) is formed in a flat shape between the sole plates. Valve mounting apertures (152, 157) are formed in a middle sole plate that is placed vertically between other sole plates. Each check valve (V1, V2) integrated via a support member is mounted to the valve mounting aperture (152, 157).

6 Claims, 31 Drawing Sheets

(51) Int. Cl.
    *A43B 13/16*     (2006.01)
    *B32B 3/26*     (2006.01)
    *B32B 5/18*     (2006.01)

(52) U.S. Cl.
    CPC ............ *A43B 13/20* (2013.01); *A43B 13/203* (2013.01); *B32B 3/266* (2013.01); *B32B 5/18* (2013.01); *B32B 2437/02* (2013.01)

(56) References Cited

U.S. PATENT DOCUMENTS

| | | |
|---|---|---|
| 2007/0294923 A1 | 12/2007 | Hayakawa |
| 2010/0205830 A1* | 8/2010 | Pulcini .................. A43B 13/14 36/29 |
| 2017/0150783 A1* | 6/2017 | Polegato Moretti ... A43B 7/085 |
| 2018/0125151 A1* | 5/2018 | Mohlmann .......... A43B 13/186 |

\* cited by examiner

VENTILATION SHOE

FIELD

The present disclosure relates to a ventilation shoe.

BACKGROUND

Shoes have poor ventilation in the shoe interior. Long-time wearing of shoes causes stuffy feet to make the wearer uncomfortable and even may cause athlete's foot. A ventilation shoe is accordingly proposed to be configured such that a pump chamber is provided in a sole and is compressed by the wearer's weight applied to the shoes during walking and by a change in load due to bending, so as to release the air to toes and achieve ventilation of the shoe interior.

In the proposed configuration, the pump chamber is provided in a thick heel portion. An opening of an air intake passage connecting with the outside air is placed in a region corresponding to the heel of the wearer's foot, and an opening of an air release passage is placed in a region located in the periphery of toes. The air intake passage and the air release passage are respectively connected with the pump chamber via check valves. The pump chamber is compressed by stepping down the ventilation shoe, so as to release the air in the pump chamber through the air release passage to the periphery of the toes of the foot. The pump chamber is restored by lifting up the ventilation shoe, so as to provide a negative pressure in the pump chamber and suck the air through the air intake passage into the pump chamber. This intends to achieve ventilation of the shoe interior.

CITATION LIST

Patent Literature

PTL 1: JP 2014-200327A

SUMMARY

Technical Problem

The ventilation shoe of the prior art configuration needs check valves placed between the pump chamber and the air intake passage and between the pump chamber and the air release passage and configured to allow the air to flow in and flow out in only one direction. This check valve is configured by using a general ball valve or the like in the heel. The check valve accordingly has the complicated structure and the overweight.

The check valve is used in a location constantly exposed to bending, a strong load and wear and requires a significant reduction in thickness. No proposed check valves have yet met such requirements. One disclosed configuration uses a reed valve for the check valve (as described in Jp 2004-181113A). The proposed check valves are only desk plan and are not in practical use.

Furthermore, in the prior art configurations including the cited references, the pump chamber provided in the heel portion is connected with inside of the check valve via a pipe. This needs a large dimension in the height direction of the pump chamber and accordingly increases the thickness of the sole of the ventilation shoe. The check valve and the pipe have a large number of joints to be sealed. Such joints are likely to be separated and broken. Additionally, the pipe is extended in the sole. This interferes with bending the sole while the wearer walks. This causes a problem like insufficient compression of the pump chamber.

As described above, the optimum valve structure has not been developed as the check valve for the ventilation shoe. Various ventilation shoes have been proposed as only desk plan and have not come on the market.

In order to solve the problems of the prior art, an object of the present disclosure is to provide a ventilation shoe that enables a shoe interior to be sufficiently ventilated and that is suitable for practical use.

Solution to Problem

According to one aspect of the invention, a ventilation shoe is provided comprising an upper, a sole and a ventilation device configured to ventilate the air in a shoe interior. The ventilation device comprises an air intake passage arranged to communicate with the outside air, an air release passage provided to be open to a sole surface in a neighborhood of a toe position and configured to release the air to the shoe interior, an air intake check valve provided to communicate with the air intake passage, and an air release check valve provided to communicate with the air release passage, and a pump chamber provided in the sole to be compressed accompanied with stepping and feed the air accumulated inside of the pump chamber from the air release passage to the shoe interior via the air release check valve and to be restored accompanied with end of stepping and take in the air from the air intake passage via the air intake check valve. Each of the air intake check valve and the air release check valve comprises a support member that includes main surface portion with an open/close aperture formed therein, and a valve element that is made of a thin flexible material, that has one end held on the support member to cover the open/close aperture from an inner side and that is configured, such that application of a pneumatic pressure from outside to the open/close aperture deforms the valve element inward to open the open/close aperture. The sole is formed by layering a plurality of sole plates, and the pump chamber is a flat chamber formed between the sole plates. Valve mounting apertures are formed inside of the sole such as to place the respective check valves therein. Each check valve is inserted in the valve mounting aperture, such that the open/close aperture is located in a vertical direction. The air intake check valve is arranged such that outside of the open/close aperture communicates with the air intake passage connecting with the shoe interior and that inside of the open/close aperture communicates with the pump chamber, and the air release check valve is arranged such that outside of the open/close aperture communicates with the pump chamber and that inside of the open/close aperture communicates with the air release passage.

The inside of the open/close aperture denotes a side on which the valve element is held, and the outside of the open/close aperture denotes a side on which the valve element is not held.

In the ventilation shoe of this aspect, when the pump chamber is compressed accompanied with walking, the compression has an influence on the valve main body through the open/close aperture of the air release check valve to open the open/close aperture and to cause the air to flow into the valve space. The air then passes through the air release passage and is released to the periphery of toes. When the bent of the pump chamber is released accompanied with end of stepping of the shoe, the pump chamber is returned to the flat plate-like shape. This increases the volume of the pump chamber and provides a negative pressure in the pump chamber. The valve space of the air intake check valve accordingly becomes a negative pressure. This has an influence on the open-close aperture through the air intake passage to open the valve element, so that the outside air flows into the pump chamber through the shoe interior. This causes the shoe interior to be ventilated continuously.

In the ventilation shoe of the above aspect, the check valve has an integrated structure including a support member that has a main surface portion with an open/close aperture formed therein and a valve element that has one end held by the support member to open the open/close aperture. The check valve is readily incorporated in the ventilation device by being mounted in the sole to communicate with the air intake passage or the air release passage.

According to another aspect of the invention, each of the air intake check valve and the air release check valve may comprise a flat open case that is configured as the support member, that includes a main surface portion and a side surface portion arranged to be continuous with the main surface portion, that forms a valve space inside thereof, and that has the open/close aperture formed in the main surface portion, and the valve element that has one end held in the open case to cover the open/close aperture from the inner side.

In the ventilation shoe of this aspect, the valve space is defined by the side surface portion on the circumference of the open case. Matching the outer shape of the open case with the valve mounting aperture enables the check valve to be stably held in the valve mounting aperture.

According to another aspect of the invention, each of the air intake check valve and the air release check valve comprises the flat open case, the valve element arranged to cover the open/close aperture from the inner side, and a cover configured to cover an open surface of the open case, and the open case and the cover define the valve space. The cover has a communication hole formed therein. The air intake check valve is arranged such that the open/close aperture communicates with the air intake passage and that the communication hole communicates with the pump chamber. The air release valve is arranged such that the open/close aperture communicates with the pump chamber and that the communication hole communicates with the air release passage.

In the ventilation shoe of this aspect, the valve space is surrounded and defined by the open case and the cover to be integrated. The check valve of this unitized structure is readily handled and is mounted to the valve mounting aperture formed in the sole plate to readily form the ventilation device. The open case and the cover effectively protect the valve element from the walking-based impact. This configuration accordingly has an advantage of excellent durability.

In the ventilation shoe of the above aspect, the valve element may be held by placing one end of the valve element between the open case and the side surface portion of the cover. The valve element is readily fixed by such assembling. One end of the valve element may be folded perpendicularly to form a folded margin, and one end of the valve element may be held by placing the folded margin between the side surface portion of the open case and the side surface portion of the cover. This folded margin firmly fixes the valve element.

The check valve suitable for the ventilation shoe of the present disclosure needs to be very thin of several millimeters in thickness and have high impact resistance. This configuration provides the check valve for the ventilation shoe, which is easily manufactured, small in size and touch and has the valve element securely held and stable performance. This accordingly achieves a ventilation shoe that is not a desk plan but is a feasible product.

According to another aspect of the invention, a valve mounting aperture which the air intake check valve is placed in and a valve mounting aperture which the air release check valve is placed in, are formed at a heel position of one middle sole plate that is placed vertically between other sole plates. The air intake check valve is inserted in the valve mounting aperture such that outside of the open/close aperture is placed at an upper position. The air release check valve is inserted in the valve mounting aperture such that outside of the open/close aperture is placed at a lower position. The pump chamber formed between the sole plates is arranged to communicate with the open/close aperture of the air intake check valve from an inner side and to communicate with the open/close aperture of the air release check valve from an outer side via a common path extended to a lower portion of the check valves.

In the ventilation shoe of this aspect, the two check valves are arranged adjacent to each other in the heel position above the heel, which is the strongest in the shoe and is unlikely to be affected by the deformation force. This configuration suppresses the respective check valves from being damaged and enhances the durability of the entire ventilation shoe.

According to another aspect of the invention, the sole is formed by layering the plurality of sole plates, and the pump chamber is the flat chamber formed between the sole plates. Valve mounting apertures are formed in a middle sole plate that is placed vertically between other sole plates to have thicknesses approximately equal to thicknesses of the respective check valves and to place the respective check valves therein. The air intake check valve is inserted in the valve mounting aperture such that the open/close aperture communicates with the air intake passage connecting with the shoe interior and that the communication hole communicates with the pump chamber, and the air release check valve is inserted in the valve mounting aperture such that the open/close aperture communicates with the pump chamber and that the communication hole communicates with the air release passage.

In the ventilation shoe of this aspect, the valve mounting aperture is formed in one of the middle sole plates, and the check valve is mounted to this valve mounting aperture. The ventilation device is readily configured by layering the sole plates.

The ventilation shoes include all shoes that requires ventilation, such as men's shoes, women's shoes, sport shoes, safety shoes, boots, rubber boots and golf shoes.

Advantageous Effects

The sole is configured by layering a plurality of sole plates, and the pump chamber is formed in a flat shape between sole plates. Valve mounting apertures are formed in a midsole plate that is placed between other sole plates in the vertical direction, and check valves integrated via support members are mounted in the valve mounting apertures. This reduces the thickness of the sole and allows for downsizing of the ventilation shoe, while increasing the volume of the pump chamber. This configuration accordingly enables the inside of the shoe main body to be sufficiently ventilated.

DESCRIPTION OF EMBODIMENTS

The following describes a first embodiment of the present disclosure.

Figure 1:
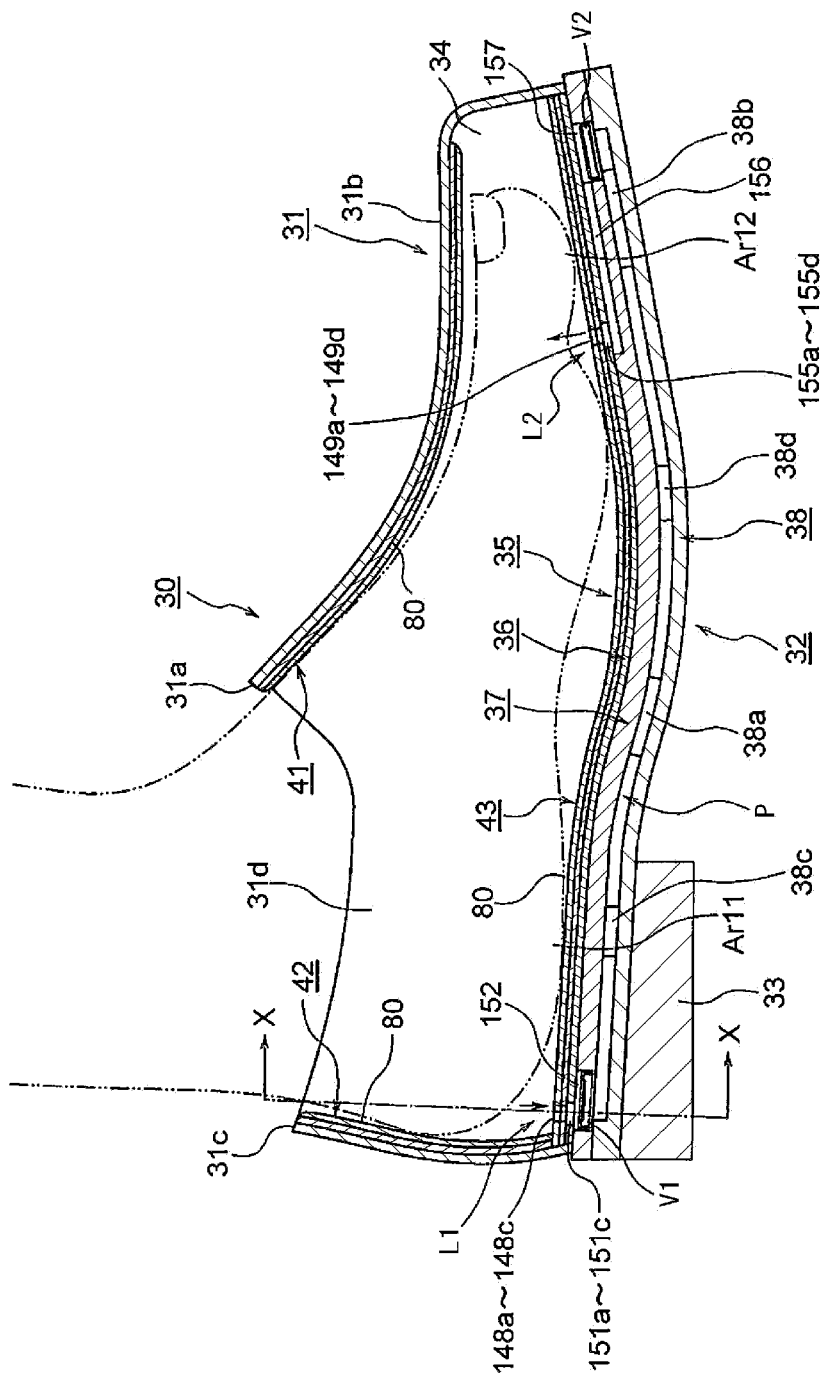
FIG. 1 is a vertical sectional view illustrating a ventilation shoe according to a first embodiment.

As shown in FIG. 1, a ventilation shoe 30 includes an upper 31, a sole 32 and a ventilation device for ventilation of a shoe interior 34.

A heel 33 is provided at a heel portion of the sole 32. The ventilation shoe 30 also includes an insole plate 35 that is in contact with a rear face of a foot, a midsole plate 36 that is placed below the insole plate 35 and arranged to be layered with the insole plate 35, a lower sole plate 37 that is placed below the midsole plate 36 and arranged to be layered with the midsole plate 36, and an outsole plate 38 that is placed below the lower sole plate 37 and arranged to be layered with the lower sole plate 37. The insole plate 35 to the outsole plate 38 correspond to the sole plates of the present disclosure constituting the sole 32.

The shoe interior 34 of the ventilation shoe 30 is surrounded by the upper 31 and the sole 32 and is formed between the upper 31 and the insole plate 35. The insole plate 35, the midsole plate 36, the lower sole plate 37 and the outsole plate 38 are made of an elastic material such as a rubber or a soft synthetic resin and are bonded together by means of an adhesive or the like to form the sole 32.

The ventilation shoe 30 is equipped with the ventilation device configured to suck the outside air through the shoe interior 34 and release the air to the toes side of the shoe interior 34. The following describes this ventilation device.

The ventilation device is formed to be opened to a rear end portion of the shoe interior 34 and includes an air intake passage L1 configured to suck the air from the shoe interior 34, an air release passage L2 formed to be opened to a sole surface in the vicinity of a toe position in the shoe interior 34 and configured to release the air to the shoe interior 34, and a pump chamber P configured to feed the air sucked through the air intake passage L1 to the air release passage L2.

The air intake passage L1 includes a plurality of openings or more specifically three openings 148a to 148c according to the embodiment, which are formed in a rear end portion of the insole plate 35 in the width direction of the ventilation shoe 30, and a plurality of intake paths or more specifically three intake paths 151a to 151c according to the embodiment, which are formed in a rear end portion of the midsole plate 36 to communicate with the respective openings 148a to 148c and with the pump chamber P. The openings 148a to 148c and the intake paths 151a to 151c communicate with an air intake check valve V1 provided immediately below to form the air intake passage L1 and suck the air.

The air release passage L2 includes a plurality of openings or more specifically four openings 149a to 149d according to the embodiment, which are formed in a front end portion of the insole plate 35 in the width direction of the ventilation shoe 30, a plurality of air release paths or more specifically four air release paths 155a to 155d, which are formed in a front end portion of the midsole plate 36 in the width direction, and an air release guide path 156 formed in a front end portion of the lower sole plate 37. The openings 149a to 149d and the air release paths 155a to 155d communicate with the air release guide path 156 and an air release check valve V2 provided immediately below to form the air release passage L2 and release the air.

As described above, the ventilation device includes the pump chamber P configured by forming the space between the lower sole plate 37 that is a middle sole plate and the outsole plate 38, an air intake valve mounting aperture 152 formed in a rear end portion of the lower sole plate 37 to communicate with the intake paths 151a to 151c, the air intake check valve V1 placed in the valve mounting aperture 152, an air release valve mounting aperture 157 formed in the front end portion of the lower sole plate 37 to communicate with the air release guide path 156, and the air release check valve V2 placed in the valve mounting aperture 157.

Figure 7:
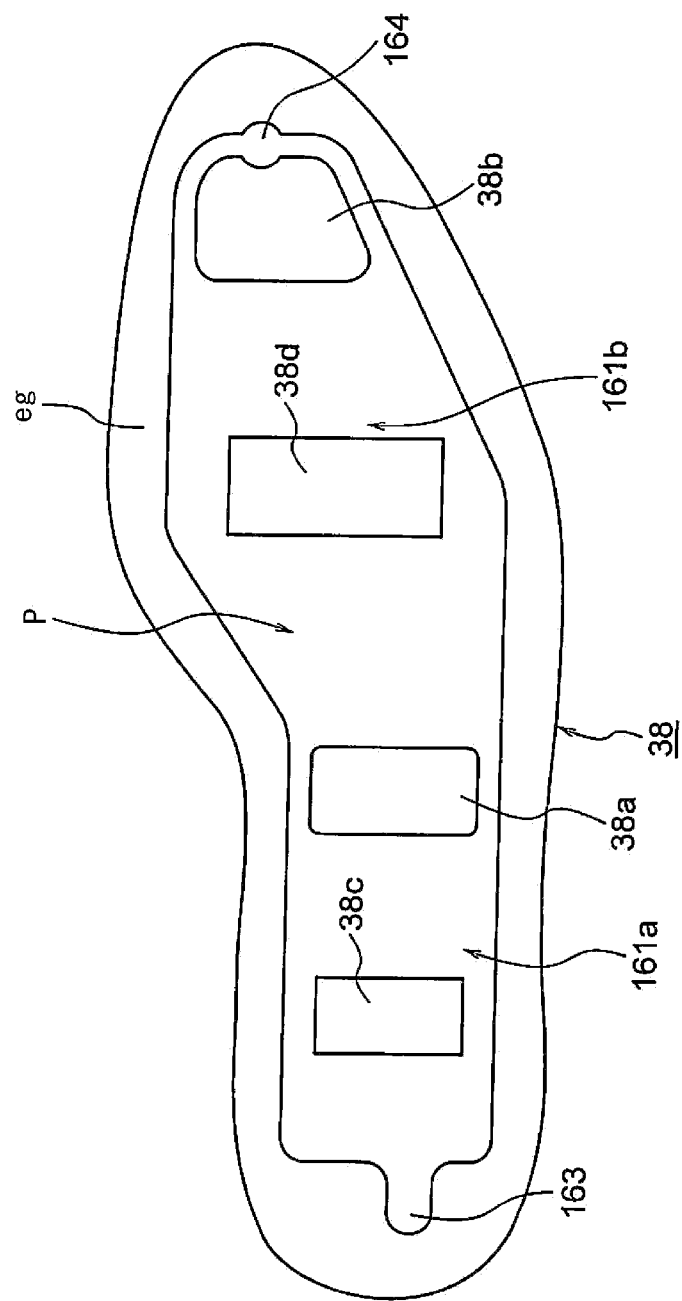
FIG. 7 is a plan view illustrating an outsole plate according to the first embodiment.

As shown in FIG. 7, the pump chamber P is configured by forming a recess that has a sufficiently wide area and has a depth of about several [mm] with leaving a periphery in an upper surface of the outsole plate 38 and applying the lower sole plate 37 to the outsole plate 38 to be closely attached thereto. The pump chamber P includes a connection port 163 provided in a rear end to communicate with the air intake valve mounting aperture 152 and a connection port 164 provided in a front end to communicate with the air release valve mounting aperture 157. Protruded spacers 38a and 38b are formed in the outsole plate 38, such that their upper surfaces are arranged to be flush with the upper surface of the outsole plate 38. Additionally, cushion members 38c and 38d made of an elastic material such as a rubber are arranged in a region 161a between the connection port 163 and the protruded spacer 38a in the pump chamber and in a region 161b between the protruded spacers 38a and 38b in the pump chamber P, such as to be bonded between the outsole plate 38 and the lower sole plate 37. The protruded spacers 38a and 38b and the cushion members 38c and 38d serve to suppress aged deterioration in the shape of the lower sole plate 37 by the long-term use of the ventilation shoe 30.

The volume of the pump chamber P may be increased by changing the area, the depth and the like of the recess. This further increases the amount of the air released to the shoe interior 34 or sucked from outside of the shoe interior 34.

The following describes a first embodiment of the air intake check valve V1 and the air release check valve V2.

As shown in FIGS. 8 to 12, the air intake check valve V1 or the air release check valve V2 includes a valve element T, an open case 201, and a cover 202 that is closely fit in the open case 201. The open case 201 is configured as the support member of the present disclosure. The air intake check valve V1 and the air release check valve V2 have identical structures and are arranged upside down.

The open case 201 includes a main surface portion f and a side surface portion w arranged to be continuous with the main surface portion f and is formed in a thin, flat box-like shape having one surface open. An open/close aperture 205a or 205b is formed in the main surface portion f to serve as an air inlet controlled to be opened and closed. The cover 202 similarly includes a main surface portion and a side surface portion arranged to be continuous with the main surface portion and is formed in a thin, flat box-like shape having one surface open. A communication hole 206a or 206b is formed in the main surface portion to serve as an air outlet. The open/close aperture 205a or 205b and the communication hole 206a or 206b are arranged to be eccentric to each other. When the open/close aperture 205a or 205b is opened, the communication hole 206a or 206b is not closed by the valve element T. This configuration enables the air to smoothly flow. The valve element T is placed in the open case 201, such that the exterior angles of the valve element T are aligned with the interior angles of the open case 201. The cover 202 is inserted into the open case 201, and the edge of the valve element T is inserted and fixed. This forms a check valve having a valve space inside thereof (inside of the open/close aperture 205a or 205b). The open case 201 and the cover 202 are joined with each other by adhesion or by caulking to be integrated with each other.

Figure 8:
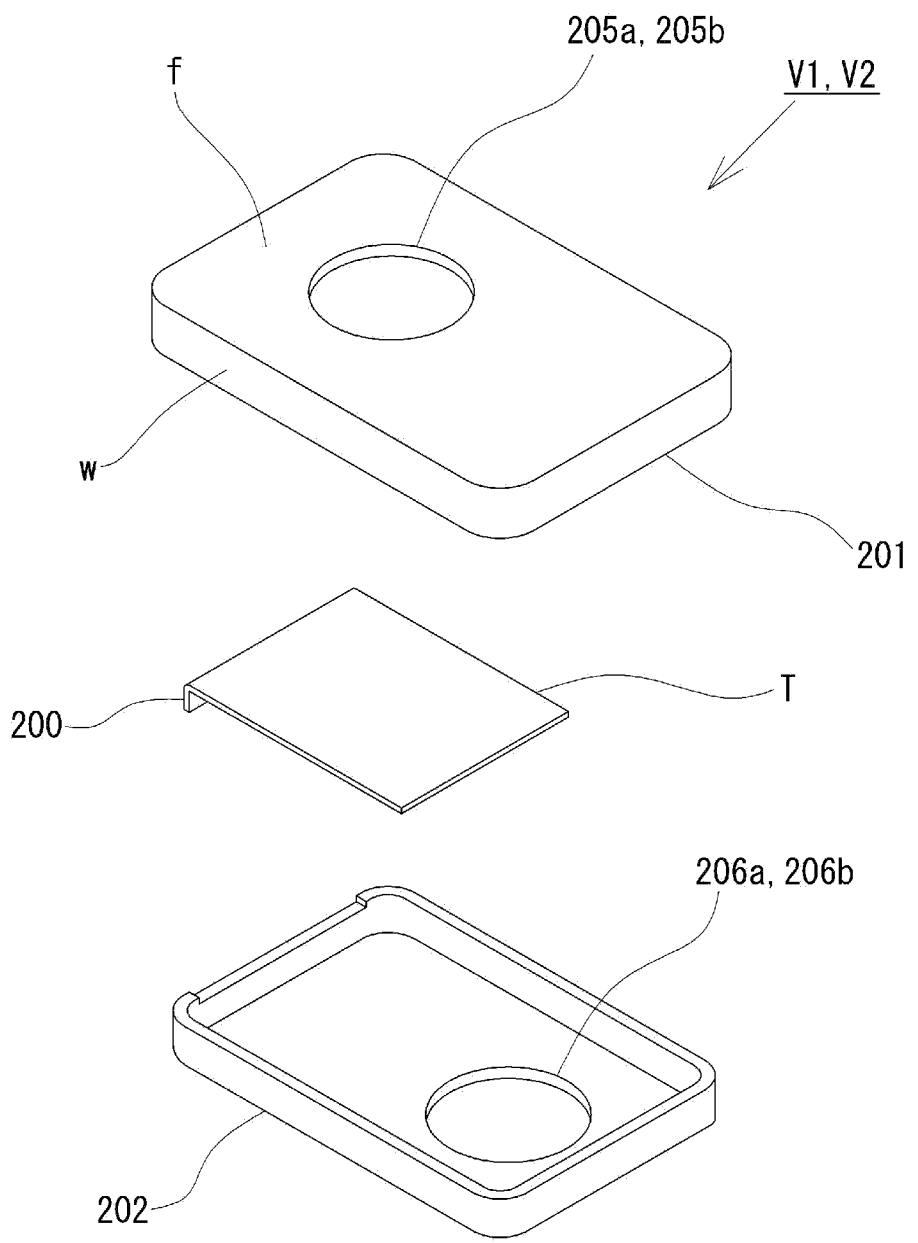
FIG. 8 is an exploded perspective view illustrating a first embodiment of check valves V1 and V2.
Figure 9:
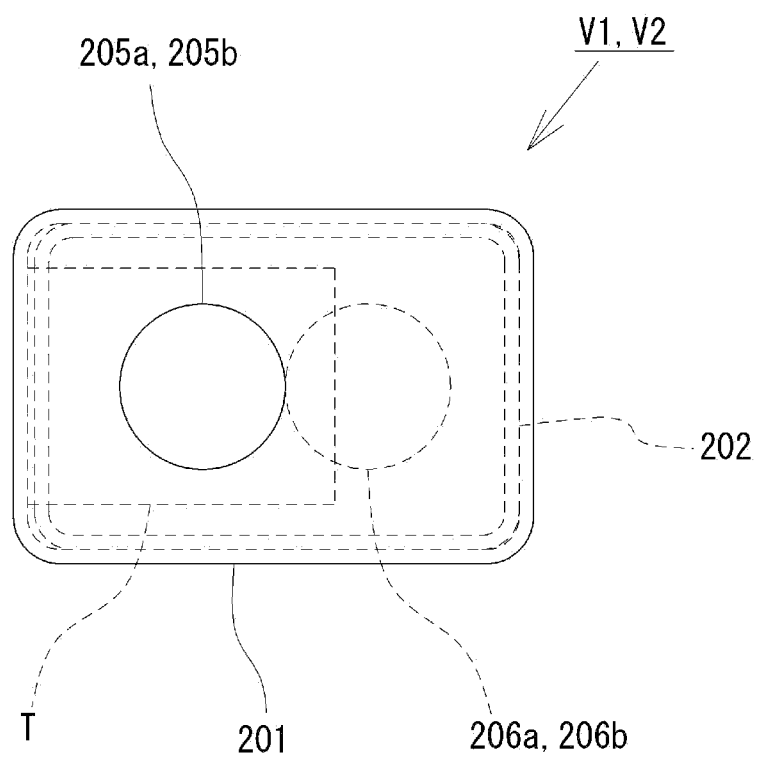
FIG. 9 is a plan view illustrating the check valves V1 and V2.
Figure 10:
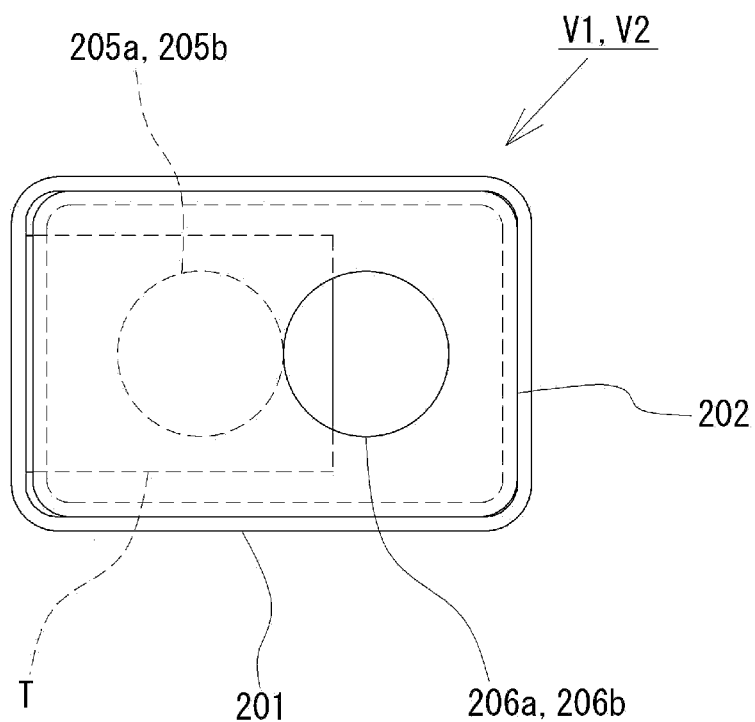
FIG. 10 is a bottom view illustrating the check valves V1 and V2.

As shown in FIG. 8, the valve element T is formed from a thin metal plate or synthetic resin plate having the thickness of approximately 0.03 mm and has its rear end bent to provide a folded margin 200. Placing this folded margin 200 between a case side surface and a cover side surface enables the valve element T to be held and enables the valve element T to be readily assembled to the open case 201 without using fixation means of the valve element T.

Figure 11:
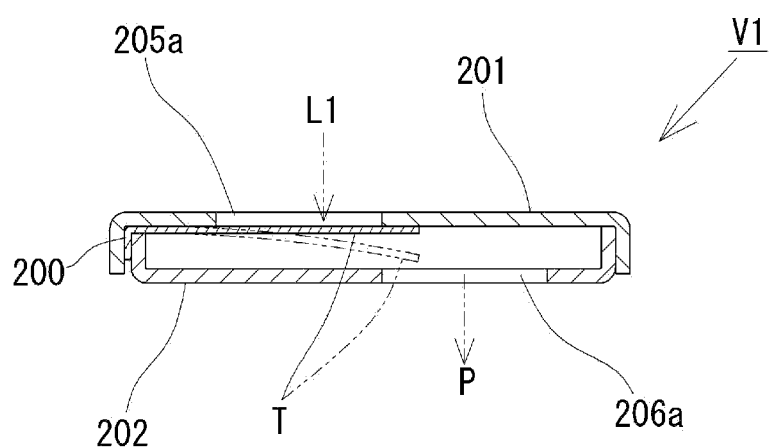
FIG. 11 is a vertical sectional view illustrating the first embodiment used as an air intake check valve V1.

The air intake check valve V1 is mounted to the air intake valve mounting aperture 152, such that the open/close aperture 205a is placed on an upper side and the communication hole 206a is placed on a lower side as shown in FIG. 11. The outside of the open/close aperture 205a communicates with the air intake passage L1 (shown in FIG. 1), and the communication hole 206a communicates with the pump chamber P (shown in FIG. 8).

Figure 12:
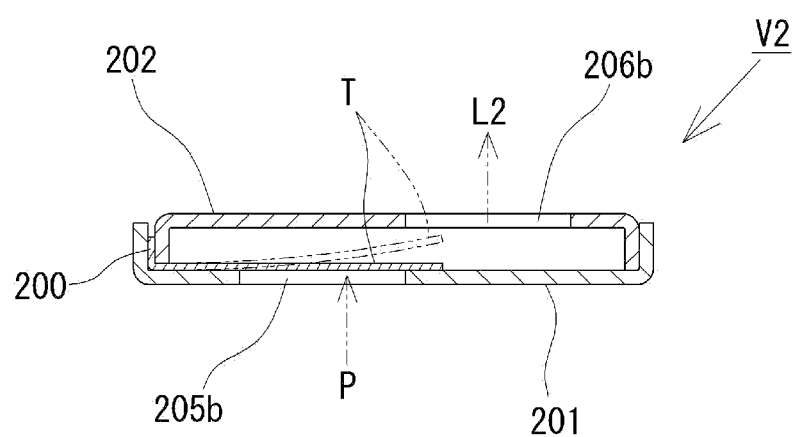
FIG. 12 is a vertical sectional view illustrating the first embodiment used as an air release check valve V2.

The air release check valve V2 is mounted, such that the open/close aperture 205b is placed on a lower side and the communication hole 206b is placed on an upper side as shown in FIG. 12. The open/close aperture 205b communicates with the pump chamber P (shown in FIG. 7), and the outside of the communication hole 206b communicates with the air release passage L2.

In the air intake check valve V1 and the air release check valve V2, the open case 201 and the cover 202 are made of a material of high strength such as a metal or a synthetic resin, and the valve element T is made of a thin flexible material such as a metal or a synthetic resin.

When the internal pressure of the pump chamber P becomes lower than the pressure of the shoe interior 34 (becomes negative pressure), the air intake check valve V1 is opened to suck the air in the shoe interior 34 through the air intake passage L1 into the pump chamber P. When the internal pressure of the pump chamber P becomes higher than the pressure of the shoe interior 34, the air release check valve V2 is opened to release the air in the pump chamber P through the air release passage L2.

As described above, the check valve V1 or V2 is configured, such that the valve space is defined by the open case 201 and the cover 202 and that the valve element T is fixed to the open case 201 to be integrated. The check valve V1 or V2 of this unitized structure is readily handled and is mounted to the valve mounting aperture formed in the sole plate to readily form the ventilation device. The open case 201 and the cover 202 effectively protect the valve element T from the walking-based impact. This configuration accordingly has an advantage of excellent durability. The check valve V1 or V2 has a height of 2 to 3 [mm] and has a small space of occupancy.

The arrangement of the open/close aperture 205a or 205b and the communication hole 206a or 206b to be eccentric to each other does not cause the valve element T to close the communication hole 206a or 206b when opening the open/close aperture 205a or 205b and thereby enables the air to smoothly flow. Furthermore, the air intake check valve V1 and the air release check valve V2 have identical structures. Accordingly, each check valve can be used for either of the air intake check valve V1 and the air release check valve V2 by selecting the upper side and the lower side.

The following describes the ventilation structure of the shoe interior 34.

In the ventilation shoe 30, the ventilation device sucks the air outside of the shoe interior 34 into the shoe interior 34, circulates the air, and releases the air outside of the shoe interior 34. Close contact of the foot of a wearer who wears the ventilation shoes 30 with the inner circumferential surface of the upper 31 and the surface of the insole plate 35, however, causes poor ventilation in the shoe interior 34. As a result, this fails to suck the air outside of the shoe interior 34 into the shoe interior, to circulate the air in the shoe interior 34, and to sufficiently release the air in the shoe interior 34 to the outside of the shoe interior 34.

Figure 2:
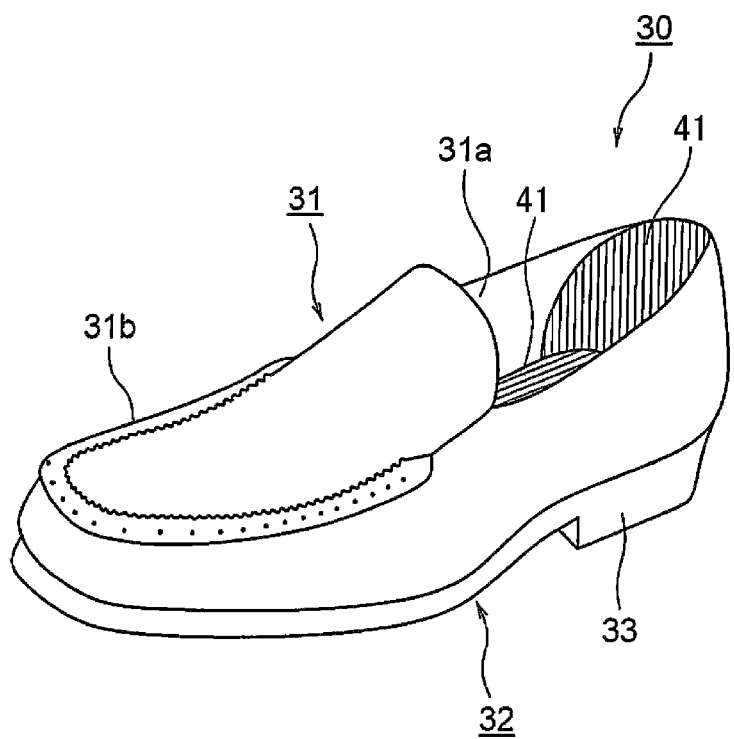
FIG. 2 is a perspective view illustrating the ventilation shoe to which the present disclosure is applied.
Figure 3:
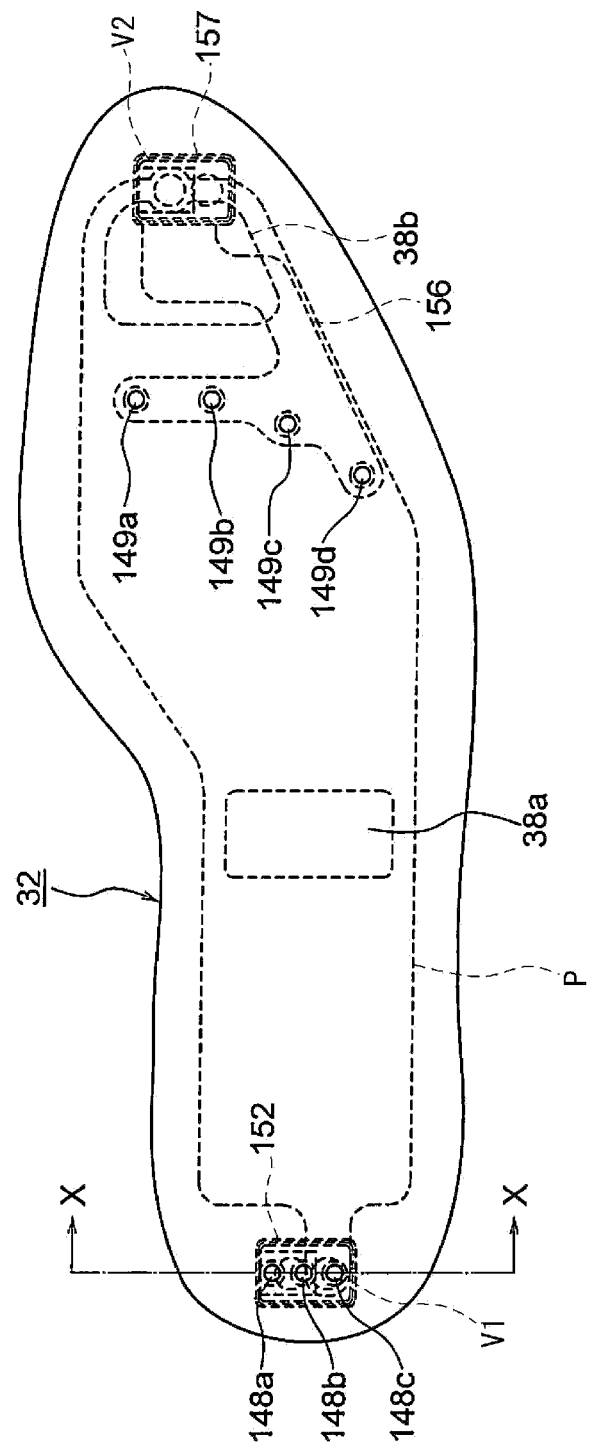
FIG. 3 is a plan view illustrating a sole according to the first embodiment.
Figure 4:
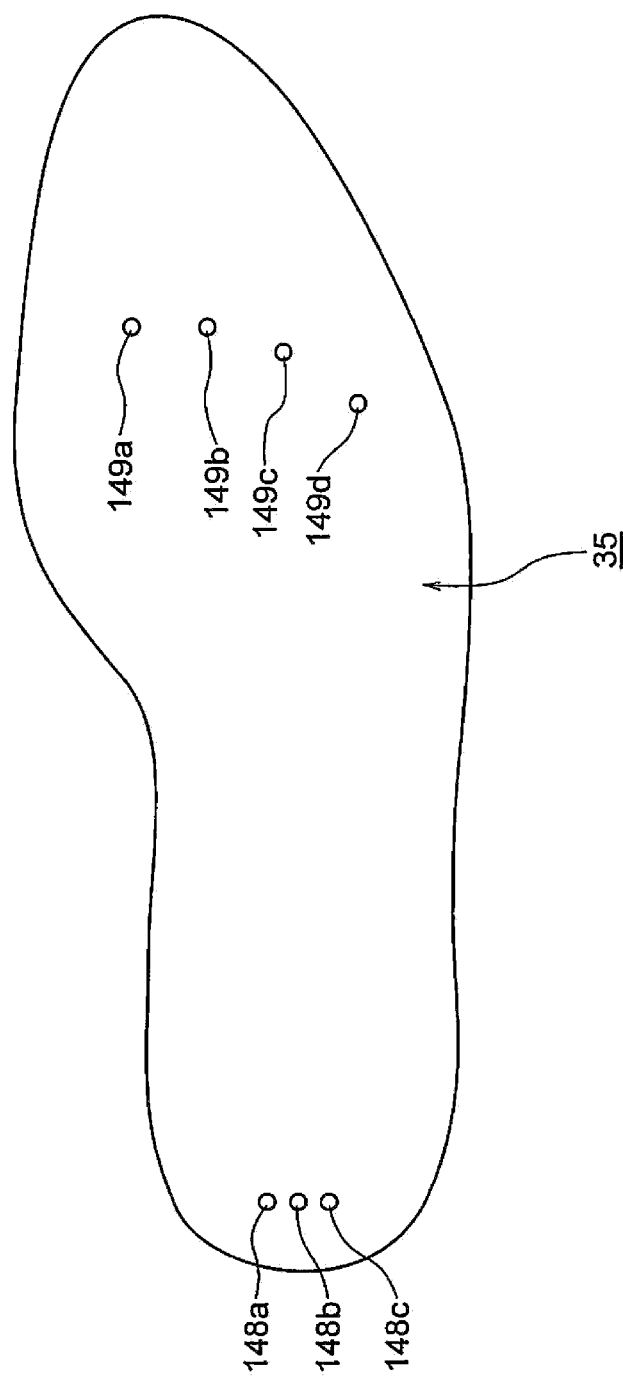
FIG. 4 is a plan view illustrating an insole plate according to the first embodiment.
Figure 5:
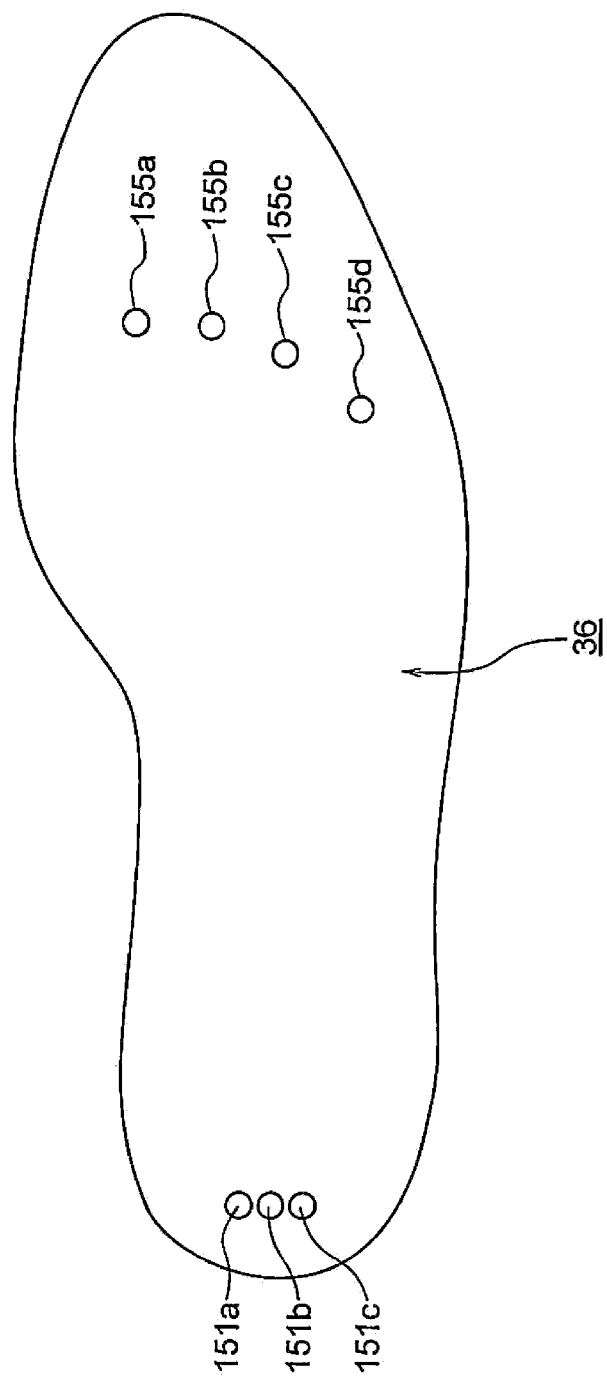
FIG. 5 is a plan view illustrating a midsole plate according to the first embodiment.
Figure 6:
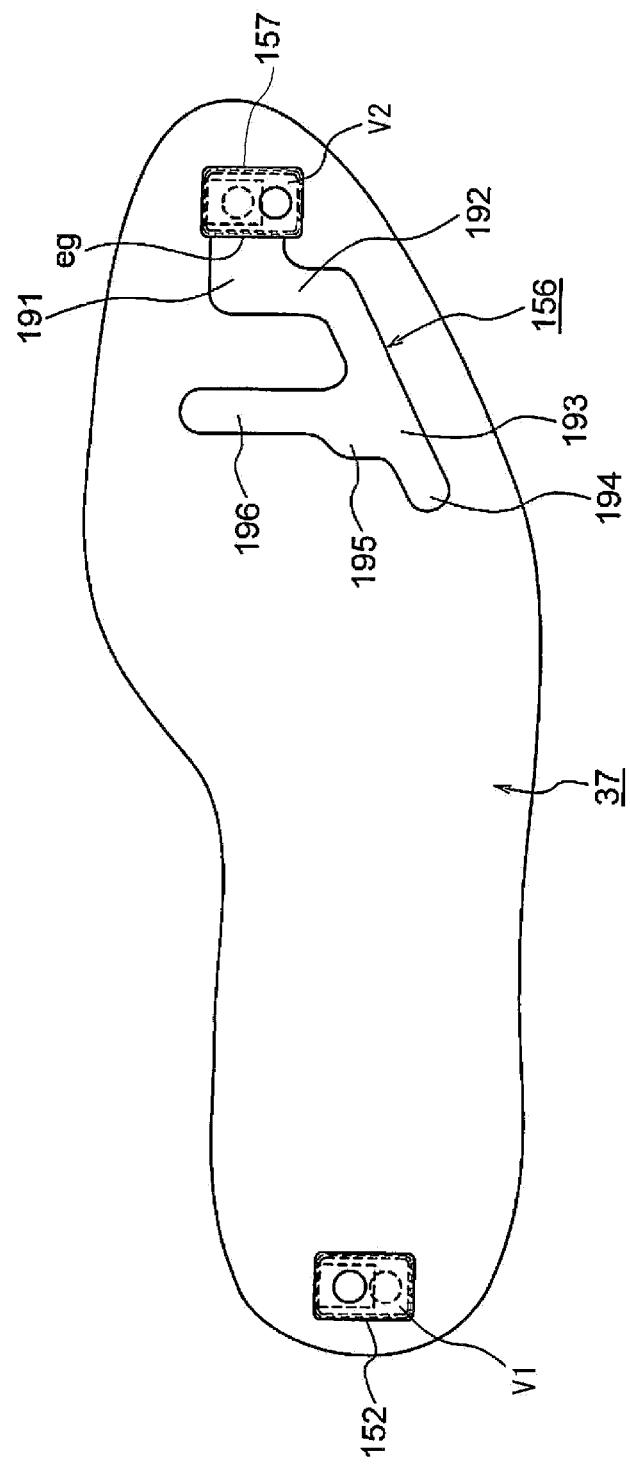
FIG. 6 is a plan view illustrating a lower sole plate according to the first embodiment.
Figure 13:
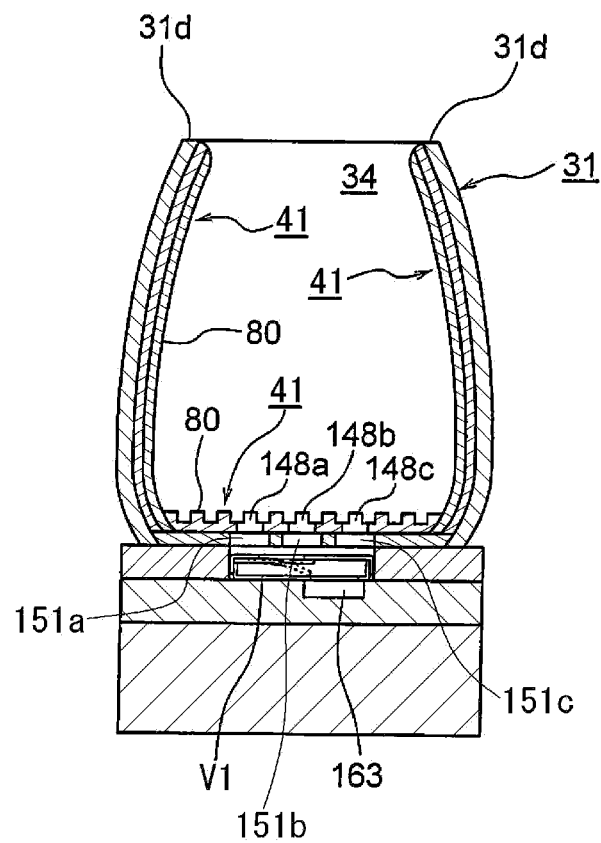
FIG. 13 is an X-X sectional view of FIG. 1.

According to the embodiment, as shown in FIG. 2 and FIG. 13, a sheet 80 with groove arrays is applied to a rear face from an opening portion 31a of the upper 31 to a toe portion 31b, to rear faces of a heel portion 31c and a side portion 31c, and to a surface of the insole plate 35. This forms a ventilation path 41 that make the shoe interior 34 communicate with the outside air. The communication between the shoe interior 34 and the outside air via the ventilation path 41 enables the air to be sufficiently circulated in the shoe interior 34, while enabling the air in the shoe interior 34 to be sufficiently released outside of the shoe interior 34 and enabling the air outside of the shoe interior 34 to be sufficiently sucked into the shoe interior 34.

This configuration causes the inside and the outside of the shoe interior 34 to communicate with each other via the first to third ventilation paths 41 to 43 (shown in FIG. 1). This accordingly enables the air to be sufficiently circulated in the shoe interior 34, while enabling the air in the shoe interior 34 to be sufficiently released outside of the shoe interior 34 and enabling the air outside of the shoe interior 34 to be sufficiently sucked into the shoe interior 34.

According to the embodiment, the sheet 80 with groove arrays may be formed by, for example, processing leather to form steps at predetermined pitches and applying a synthetic resin on a rear face of the leather.

As described above, the air intake passage L1 is configured to communicate with the outside air through the shoe interior 34. Unlike the prior art configuration that forms an opening in the heel 33 or the like, this configuration does not cause a problem of rainwater penetration through the opening and is suitable for practical use.

The following describes the operations of the ventilation shoe 30.

When the wearer wearing the ventilation shoes 30 steps one foot, the entire weight of the wearer is applied to the other foot on the ground with lifting up the heel and standing on toes. This motion compresses and bends the sole 32 and causes the lower sole plate 37 and the outsole plate 38 to approach each other in the pump chamber P. This accordingly compresses the pump chamber P to have the increased pressure. The pneumatic pressure is then applied from the open/close aperture 205b of the air release check valve V2 to the valve element T, so as to press the valve element T inward as shown by the chain line in FIG. 12. This opens the open/close aperture 205b to open the air release check valve V2. The air in the pump chamber P is ejected to the air release passage L2 and is released through the openings 149a to 149d to the shoe interior 34. In this state, the air intake check valve V1 is closed.

When the wearer grounds the stepping foot and steps the other foot, the ventilation shoe 30 of the other foot is separated from the ground surface to return the sole 32 to the flat state. This motion releases compression of the pump chamber P and causes the lower sole plate 37 and the outsole plate 38 to separate from each other. This accordingly restores the pump chamber P to have the negative pressure. The valve element T of the air intake check valve V1 is then pressed inward as shown by the chain line in FIG. 11. This opens the air intake check valve V1 and causes the air in the shoe interior 34 to be sucked from the openings 148a to 148c and fed through the air intake passage L1 and the air intake check valve V1 to the pump chamber P in the direction of an arrow shown in FIG. 1. This causes the air outside of the shoe interior 34 to be sucked into the shoe interior 34. In this state, the air release check valve V2 is closed.

While the wearer walks with alternately stepping the feet in the above manner, the air is sucked through the air intake passage L1 into the pump chamber P and is released through the air release passage L2 to the shoe interior 34. This continuously performs ventilation of the shoe interior 34.

According to the embodiment, the air outside of the shoe interior 34 is sucked from the upper edge of the upper 31 into the shoe interior 34 and is released from the upper edge of the upper 31 to the outside of the shoe interior 34. In order to suck the air outside of the shoe interior 34, there is accordingly no need to form, for example, a hole for air suction and a hole for air release in the upper 31, in the sole 32 or the like of the ventilation shoe 30. This does not cause a problem of rainwater penetration into the shoe interior 34, accompanied with ventilation of the shoe interior 34.

The protruded spacers 38a and 38b are formed to be extended in the width direction of the ventilation shoe 30. The protruded spacers 38a and 38b serve to prevent interference with bending of the insole plate 35, the midsole plate 36, the lower sole plate 37 and the outsole plate 38 while the wearer walks. This configuration enables the volume of the pump chamber P to be sufficiently changed.

The cushion members 38c and 38d are provided in the pump chamber P. When the sole 32 is compressed and bent by the weight of the wearer during walking to cause the lower sole plate 37 and the outsole plate 38 to approach each other in the pump chamber P and is then returned to the flat state, the cushion members 38c and 38d serve to quickly restore and separate the lower sole plate 37 and the outsole plate 38 from each other in the pump chamber P. This ensures ventilation of the shoe interior 34.

Additionally, according to the embodiment, as shown in FIG. 1, the air intake check valve V1 is placed behind a heel Ar11, and the air release check valve V2 is placed ahead of toes Ar12. This arrangement prevents a load from being applied to and damaging the air intake check valve V1 and the air release check valve V2 during walking. This configuration accordingly enhances the durability of the ventilation shoes 30. This arrangement also does not cause the air intake check valve V1 or the air release check valve V2 to abut on the foot and prevents the wearer from feeling discomfort.

The following describes a second embodiment of the present disclosure. The like components to those of the first embodiment are expressed by the like reference signs. Description on the advantageous effects of the first embodiment is applied to the advantageous effects of the present disclosure achieved by the like components.

Figure 14:
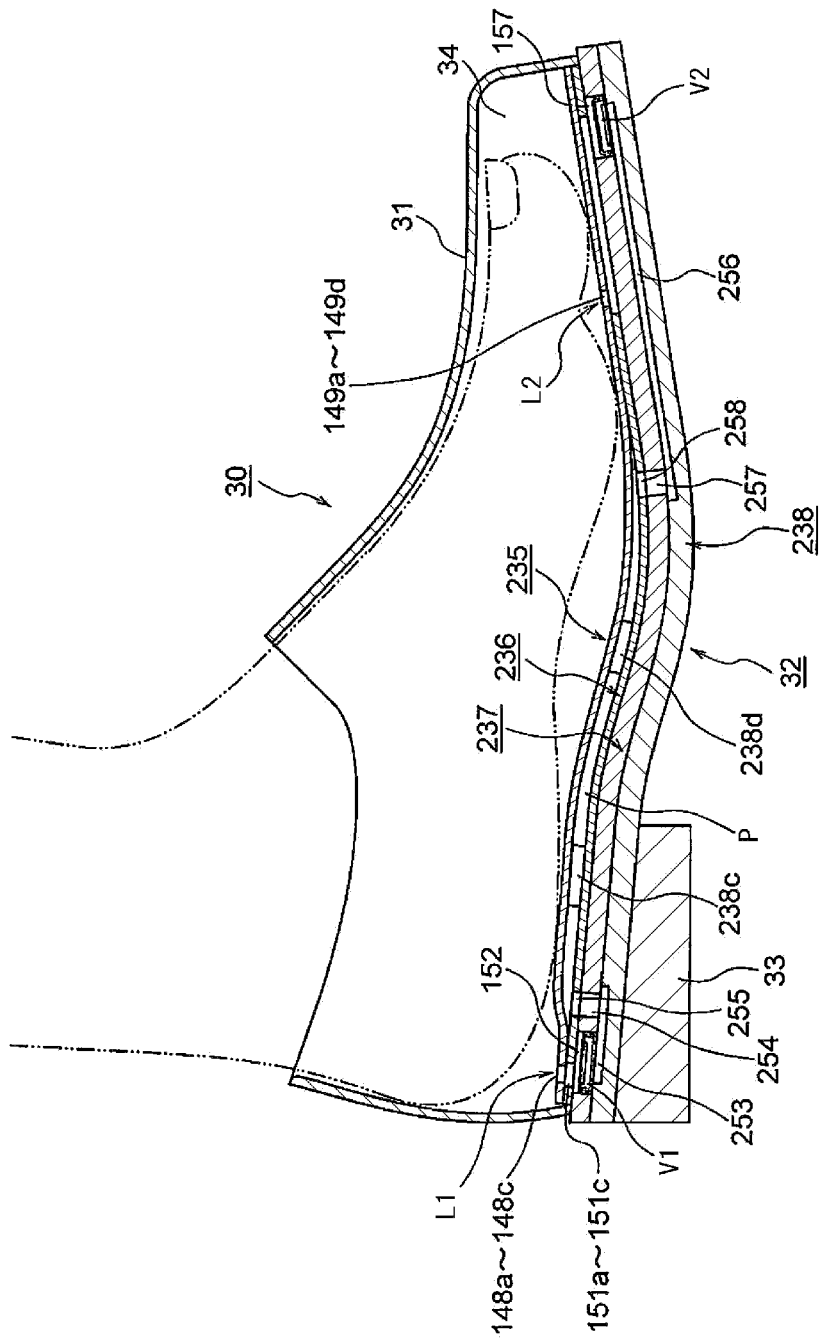
FIG. 14 is a vertical sectional view illustrating a ventilation shoe according to a second embodiment.

FIG. 14 is a vertical sectional view illustrating a ventilation shoe according to the second embodiment of the present disclosure.

According to this embodiment, a sole 32 includes an insole plate 235 as a second sole plate that is in contact with a rear face of a foot, a midsole plate 236 as a first sole plate that is placed below the insole plate 235 and arranged to be layered with the insole plate 235, a lower sole plate 237 that is placed below the midsole plate 236 and arranged to be layered with the midsole plate 236, and an outsole plate 238 that is placed below the lower sole plate 237 and arranged to be layered with the lower sole plate 237.

A pump chamber P is formed between the insole plate 235 and the midsole plate 236. A communication hole 206a of an air intake check valve V1 is arranged to communicate with the pump chamber P via first to third air intake guide paths 253, 254 and 255. An open/close aperture 205b of an air release check valve V2 is arranged to communicate with the pump chamber P via first to third air release guide paths 256, 257 and 258.

The pump chamber P is formed by deforming the insole plate 235 to form a space having a sufficiently wide area and having a depth of about several [mm] between the insole plate 235 and the midsole plate 236. Cushion members 238c and 238d made of an elastic material such as rubber foam are provided in the pump chamber P to be applied between the insole plate 235 and the midsole plate 236.

The following describes a third embodiment of the present disclosure. The like components to those of the first and the second embodiments are expressed by the like reference signs. Description on the advantageous effects of the respective embodiments is applied to the advantageous effects of the present disclosure achieved by the like components.

Figure 15:
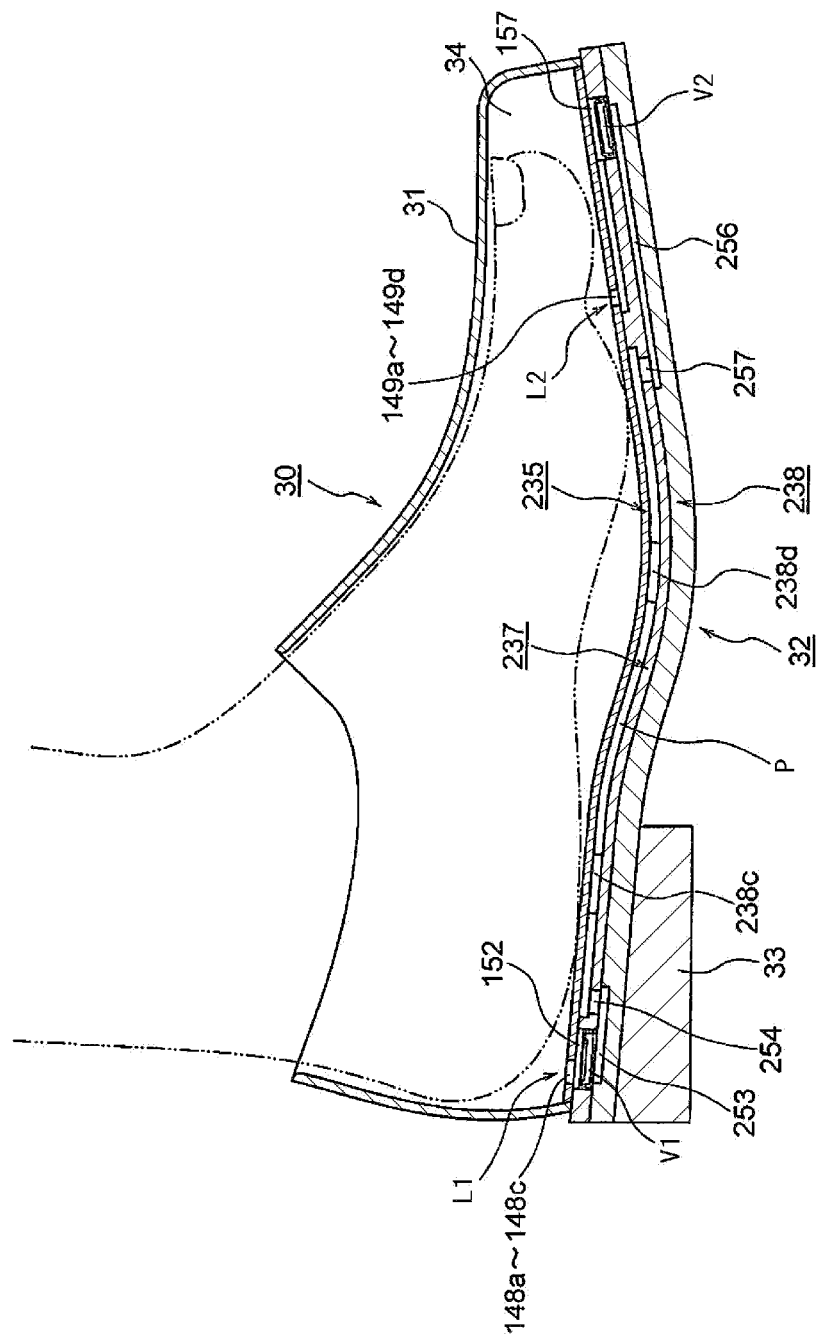
FIG. 15 is a vertical sectional view illustrating a ventilation shoe according to a third embodiment.

FIG. 15 is a vertical sectional view illustrating a ventilation shoe according to the third embodiment of the present disclosure.

According to this embodiment, a sole 32 includes an insole plate 235 as a second sole plate that is in contact with a rear face of a foot, a lower sole plate 237 as a first sole plate that is placed below the insole plate 235 and arranged to be layered with the insole plate 235, and an outsole plate 238 that is placed below the lower sole plate 237 and arranged to be layered with the lower sole plate 237. A pump chamber P is formed between the insole plate 235 and the lower sole plate 237.

The pump chamber P is configured by forming a recess that has a sufficiently wide area and has a depth of about several [mm] with leaving a periphery in an upper surface of the lower sole plate 237 and applying the midsole plate 235 to the lower sole plate 237 to be closely attached thereto.

The following describes a fourth embodiment of the present disclosure. The like components to those of the first to the third embodiments are expressed by the like reference signs. Description on the advantageous effects of the respective embodiments is applied to the advantageous effects of the present disclosure achieved by the like components.

Figure 16:
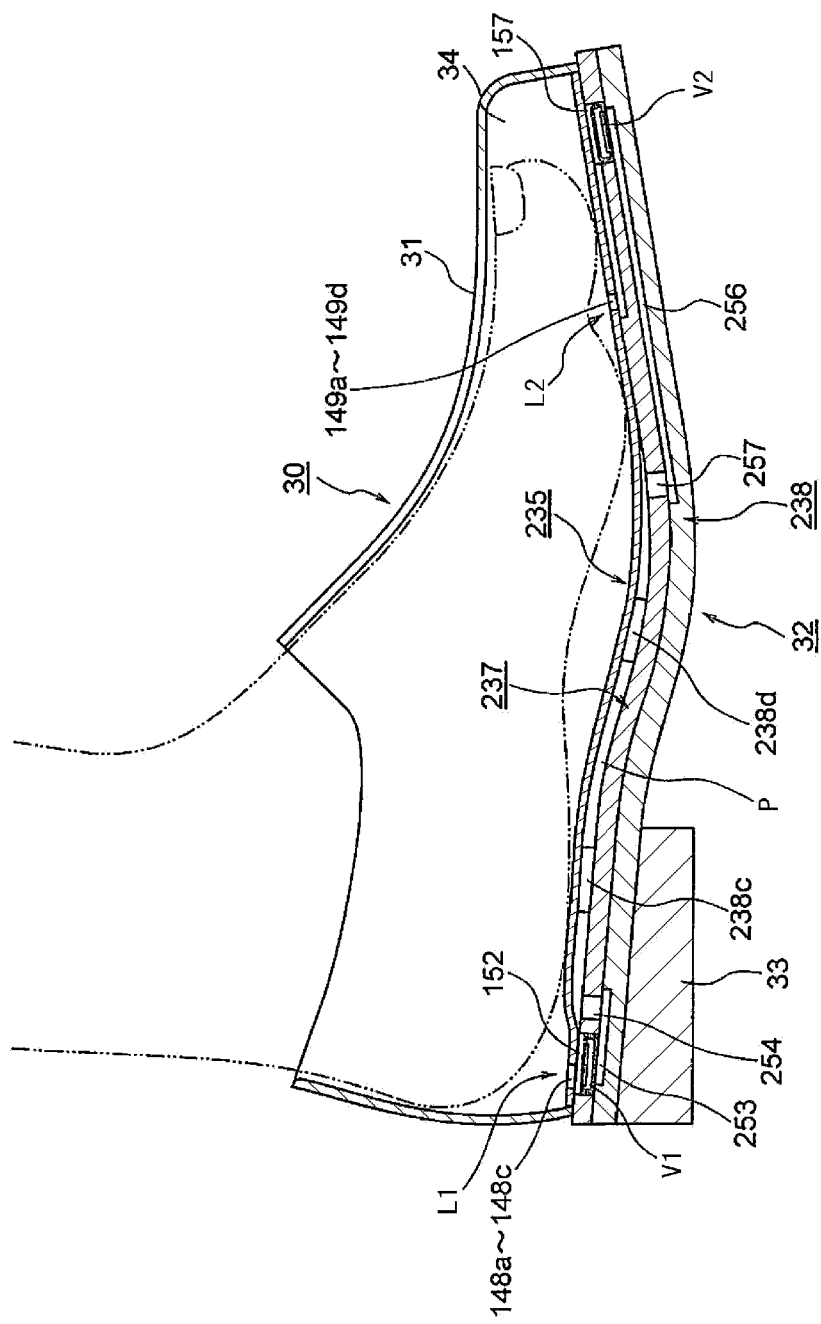
FIG. 16 is a vertical sectional view illustrating a ventilation shoe according to a fourth embodiment.

FIG. 16 is a vertical sectional view illustrating a ventilation shoe according to the fourth embodiment of the present disclosure.

According to this embodiment, a sole 32 includes an insole plate 235 that is in contact with a rear face of a foot, a lower sole plate 237 that is placed below the insole plate 235 and arranged to be layered with the insole plate 235, and an outsole plate 238 that is placed below the lower sole plate 237 and arranged to be layered with the lower sole plate 237. A pump chamber P is formed between the insole plate 235 and the lower sole plate 237.

The following describes a fifth embodiment of the present disclosure with reference to FIGS. 17 to 24. The like components to those of the first embodiment are expressed by the like reference signs. Description on the advantageous effects of the first embodiment is applied to the advantageous effects of the present disclosure achieved by the like components.

Figure 17:
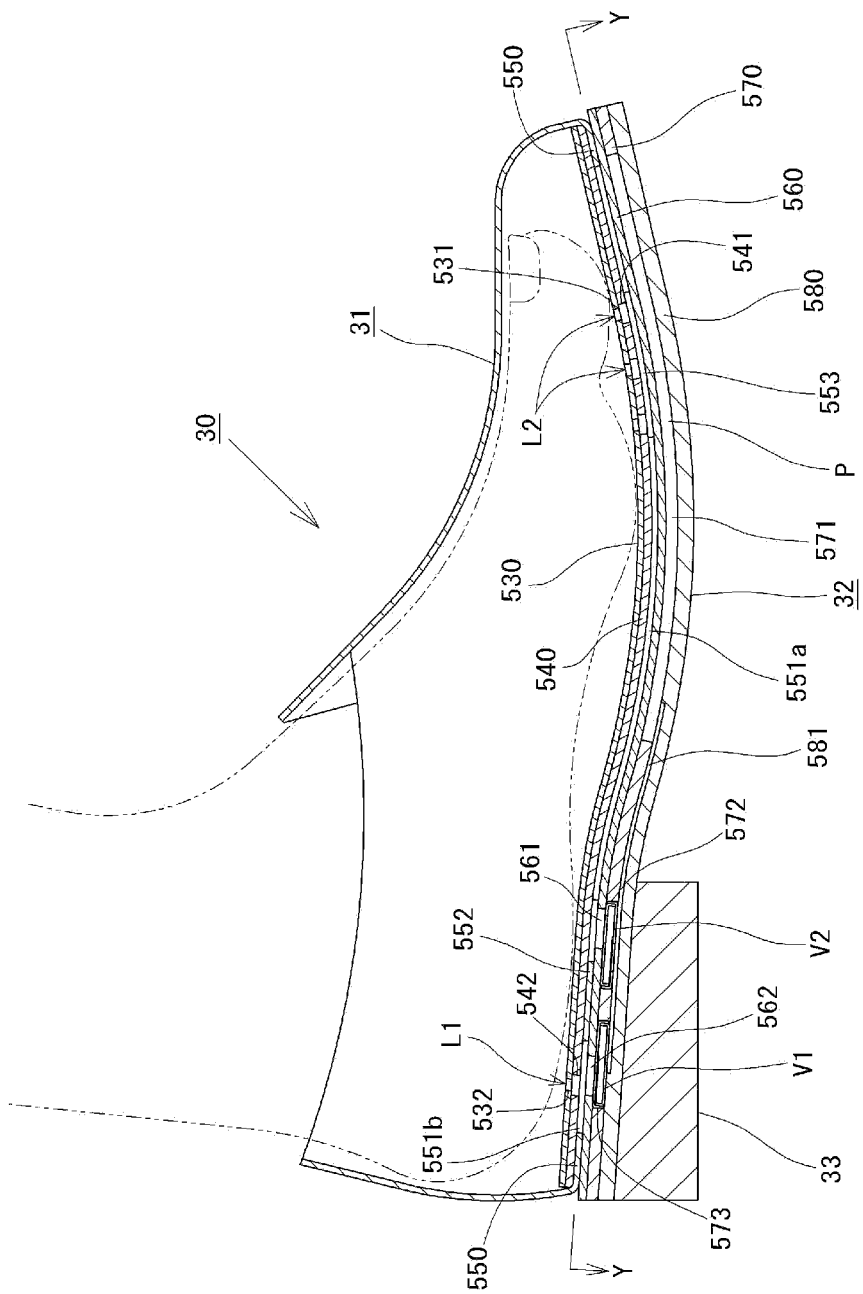
FIG. 17 is a vertical sectional view illustrating a ventilation shoe according to a fifth embodiment.

FIG. 17 is a vertical sectional view illustrating a ventilation shoe.

According to this embodiment, a sole 32 includes an insole plate 530 that is in contact with a rear face of a foot, a board plate 540 that is placed below and layered with the insole plate 530, a first lower sole plate 560 that is placed below and layered with the board plate 540 via a folded portion 550 of an upper 31, a second lower sole plate 570 that is placed below and layered with the first lower sole plate 560, and an outsole plate 580 that is placed below and layered with the second lower sole plate 570. The first lower sole plate 560 and the outsole plate 580 are arranged to cover an opening 571 of the second lower sole plate 570 and thereby form a pump chamber P. A heel 33 is fixed from below to a heel portion of the outsole plate 580. The first lower sole plate 560, the second lower sole plate 570 and the outsole plate 580 are layered as sole plates to form the sole 32.

The structures of the respective sole plates are described with reference to FIGS. 18 to 24.

Figure 19:
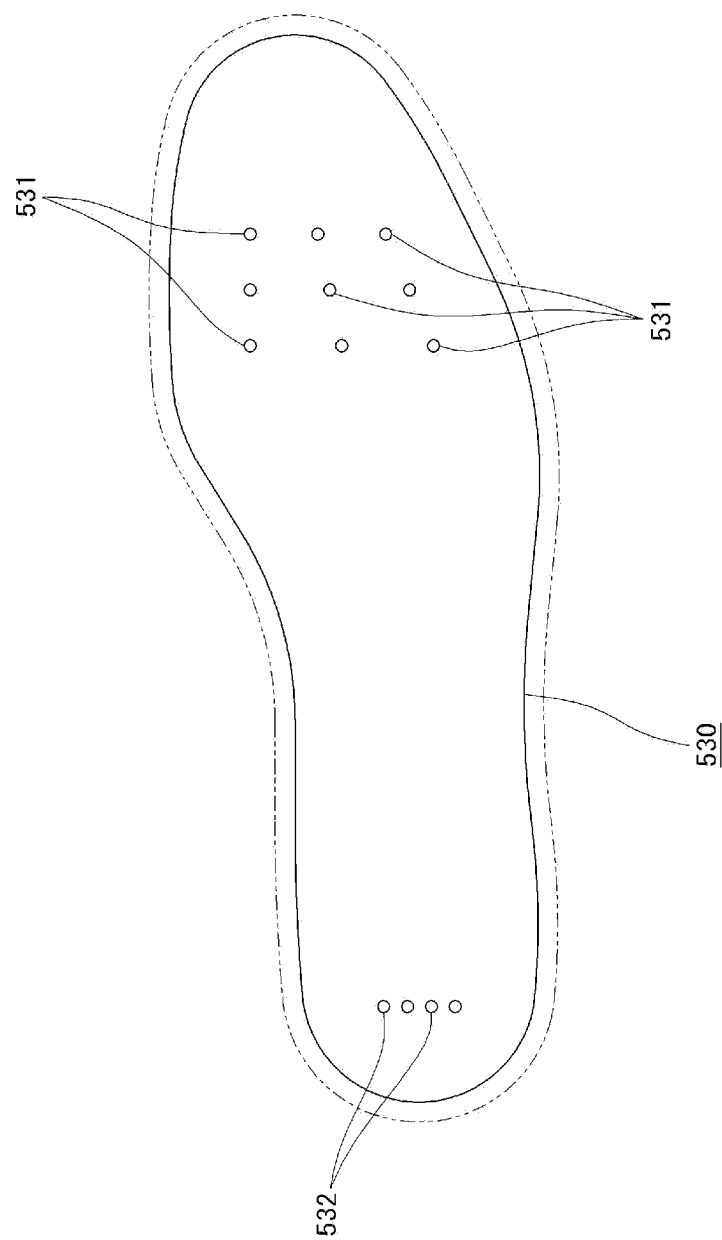
FIG. 19 is a plan view illustrating an insole plate according to the fifth embodiment.

The insole plate 530 shown in FIG. 19 has a plurality of openings 531 that are formed as air release ports in a front portion corresponding to a toe position and a plurality of openings 532 that are formed as air intake ports in a rear portion.

Figure 18:
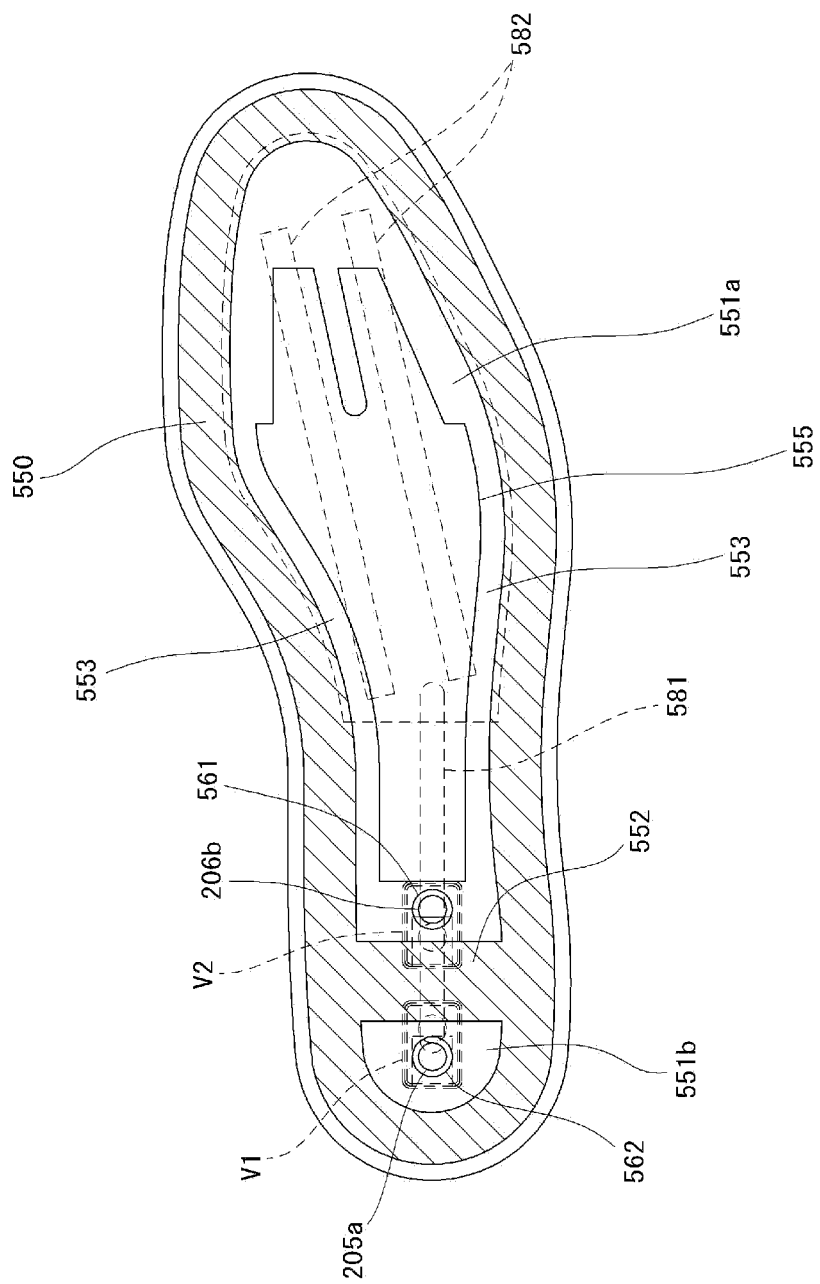
FIG. 18 is a Y-Y sectional view of FIG. 17.

The board plate 540 layered with the insole plate 530 is laid on the folded portion 550 to form the upper 31. As shown in FIG. 18, the board plate 540 has openings 541 that are placed below and aligned with the openings 531 and openings 542 that are placed below and aligned with the openings 532.

Figure 20:
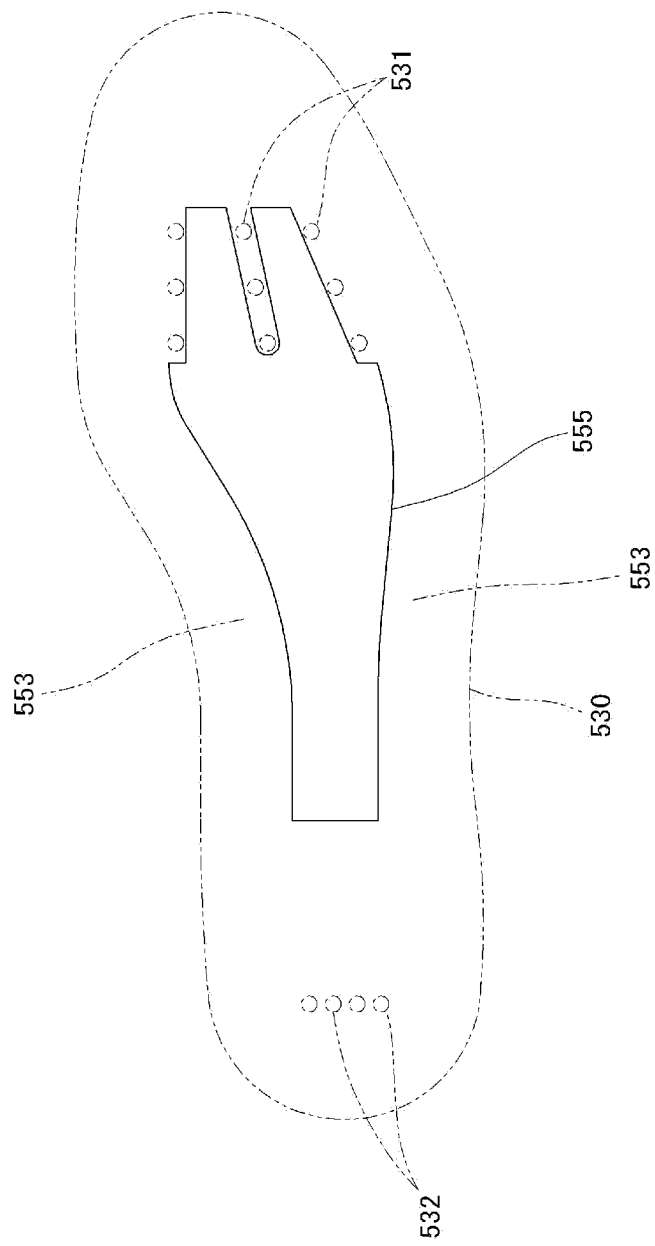
FIG. 20 is a plan view illustrating a spacer according to the fifth embodiment.

As shown in FIG. 18, connection openings 551a and 551b are formed on the inner side of the folded portion 550 by the thickness of the folded portion 550. The connection openings 551a and 551b are parted from each other by a parting film portion 552 that is formed in the vicinity of its heel portion to have the same thickness as that of the folded portion 550. The connection opening 551a is arranged to communicate with a communication hole 206b of an air release check valve V2 on the heel side of the connection opening 551a. The connection opening 551a is extended to the front portion to be placed below and opposed to the openings 531 and 541. A thin plate-like spacer 555 having the same thickness as that of the folded portion 550 is placed in this connection opening 551a as shown in FIG. 20.

A communication path 553 (shown in FIG. 18 and FIG. 20) is formed in the periphery of the spacer 555, and the connection opening 551a in the front portion communicates with the openings 531 and 541 via this communication path 553. Furthermore, the connection opening 551b in the rear portion is placed above an open/close aperture 205 of an air intake check valve V1 to communicate with the open/close aperture 205. This spacer 555 is formed in such a shape that does not close the openings 531 and 541 in the front portion and is extended toward the openings 531 and 541. This spacer 555 serves to maintain the height of the communication path 553 without compression.

Figure 21:
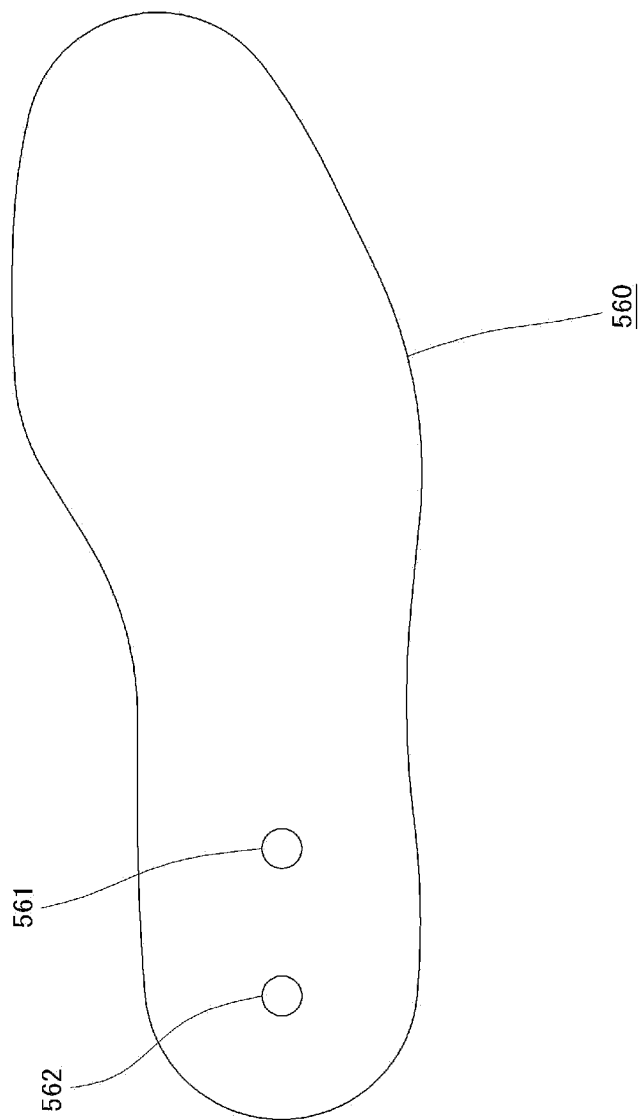
FIG. 21 is a plan view illustrating a first lower sole plate according to the fifth embodiment.

An air release connection hole 561 and an air intake connection hole 562 are respectively formed in a front part and in a rear part of a heel portion of the first lower sole plate 560 shown in FIG. 21. The air release connection hole 561 is arranged to be aligned with the communication hole 206b of the air release check valve V2, and the air intake connection hole 562 is arranged to be aligned with the open/close aperture 205a of the air intake check valve V1.

Figure 22:
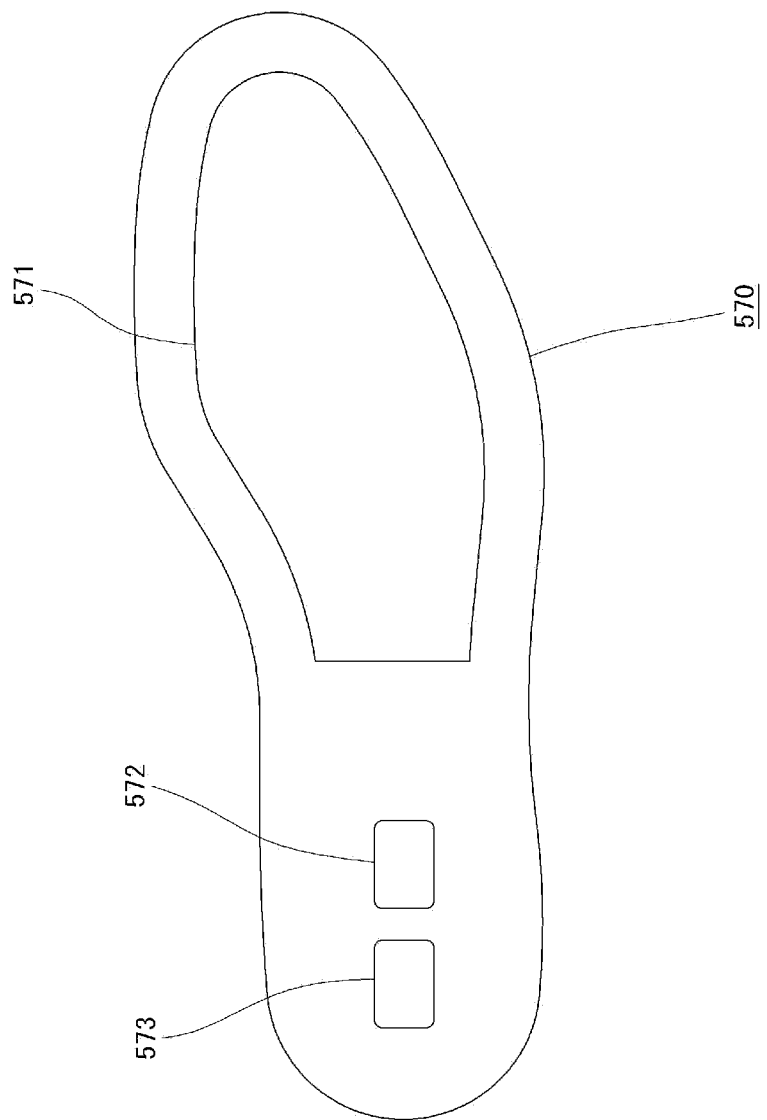
FIG. 22 is a plan view illustrating a second lower sole plate according to the fifth embodiment.

An opening 571 to make the pump chamber P is formed from a plantar arch portion toward a toe portion of the second lower sole plate 570 that is a middle sole plate as shown in FIG. 22. A valve mounting aperture 572 in a rectangular shape which the air release check valve V2 is closely mounted to is formed in a front part of a heel portion of the second lower sole plate 570. A valve mounting aperture 573 in a rectangular shape which the air intake check valve V1 is closely mounted to is formed in a rear part of the heel portion. The second lower sole plate 570 has a thickness that is equal to the thicknesses of the respective check valves V1 and V2 and that is set to about 2 to 4 mm.

Figure 23:
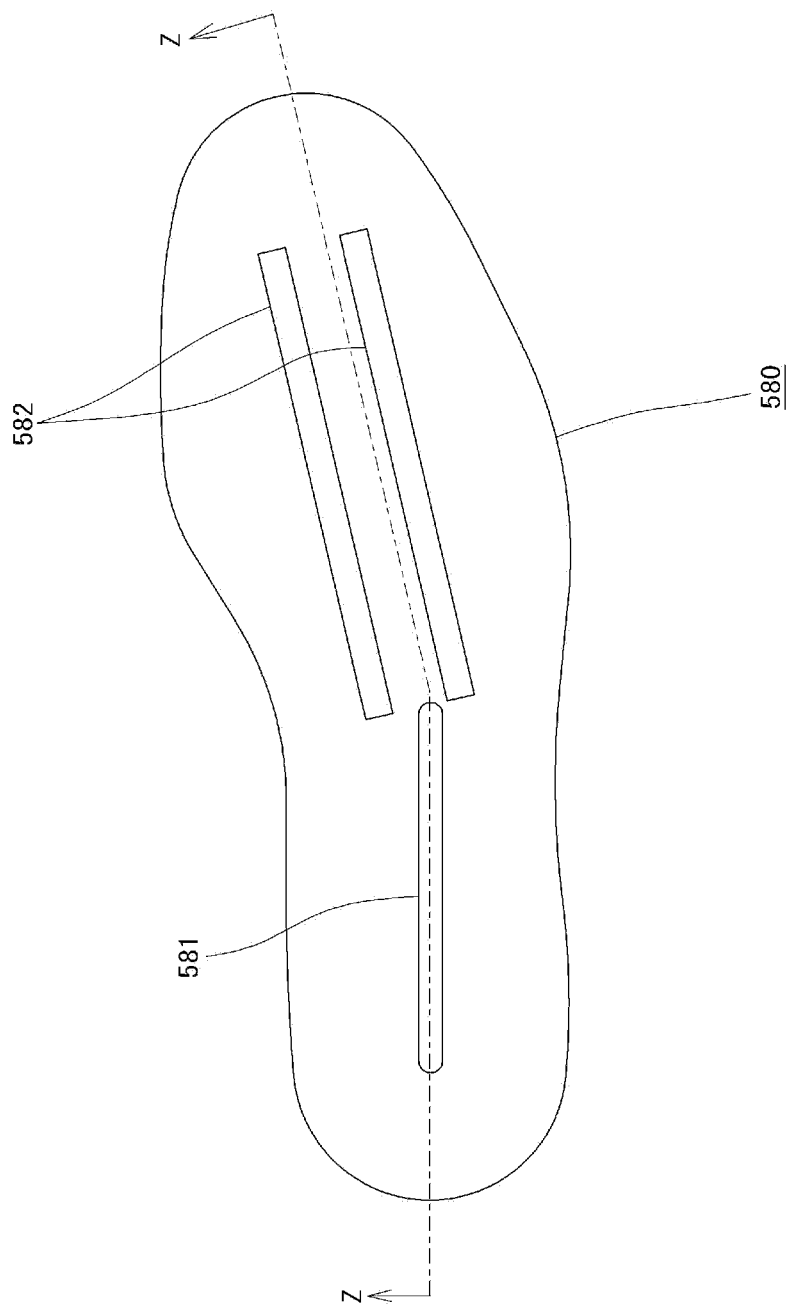
FIG. 23 is a plan view illustrating an outsole plate according to the fifth embodiment.
Figure 24:
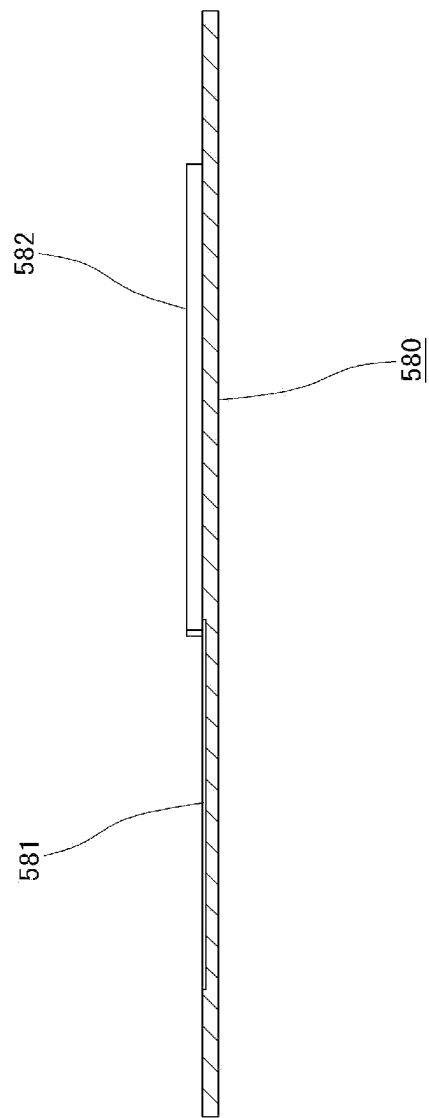
FIG. 24 is a Z-Z sectional view of FIG. 23.

A common path 581 is formed in an upper surface of its rear half portion of the outsole plate 580 shown in FIG. 23 and FIG. 24. This common path 581 is formed as a long thin groove having a front end that reaches the opening 571 of the second lower sole plate 570 and having a rear part that crosses below the valve mounting apertures 572 and 573. Two cushion members 582 are bonded to the upper surface of its front half portion. The cushion members 582 are arranged to be placed in the opening 571 and have a plate thickness that is approximately equal to the plate thickness of the second lower sole plate 570. The pump chamber P having an upper surface and a lower surface shielded by the opening 571 is formed by covering the upper surface side of the opening 571 with the first lower sole plate 560 and covering the lower surface side of the opening 571 with the outsole plate 580. The cushion members 582 serve to assist restoration of the compressed pump chamber.

The lower sole plates 560 and 570 and the outsole plate 580 are made of an elastic material such as a rubber or a soft synthetic resin and are bonded to one another by means of an adhesive or the like to serve as sole plates and form the sole 32.

The following describes a sixth embodiment of the present disclosure.

The spacer 555, the first lower sole plate 560, and the second lower sole plate 570 are separately formed and are bonded to one another according to the above embodiment, but may be integrally molded.

Figure 25:
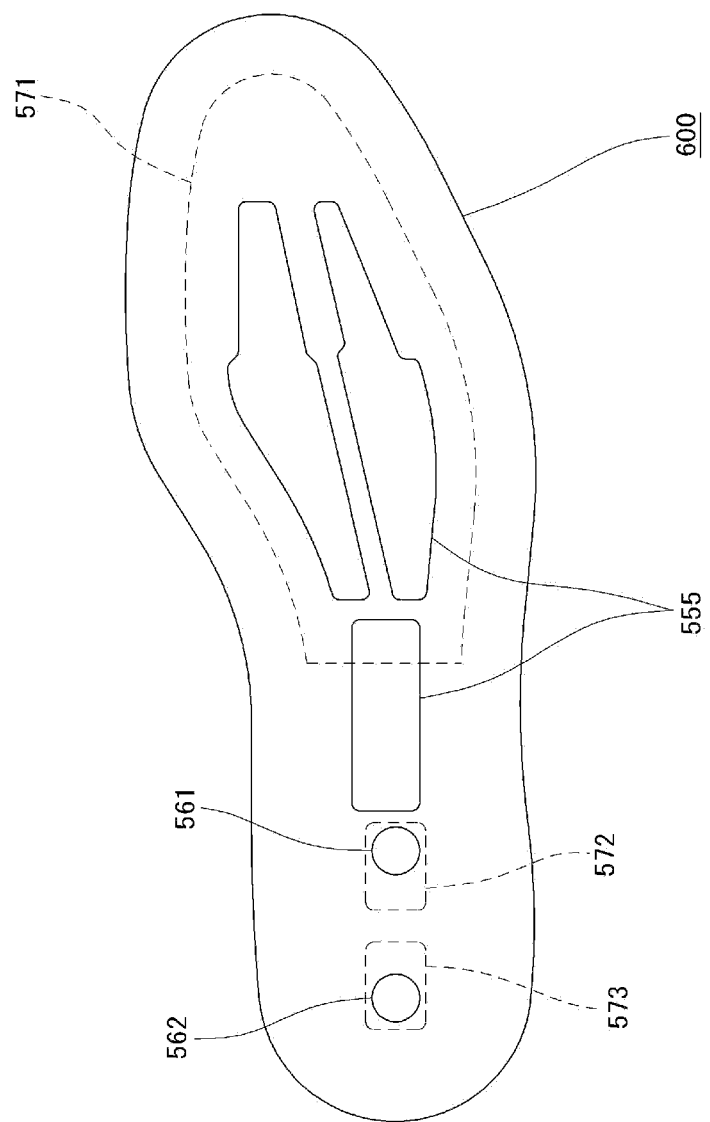
FIG. 25 is a plan view illustrating a lower sole plate according to a sixth embodiment.
Figure 26:
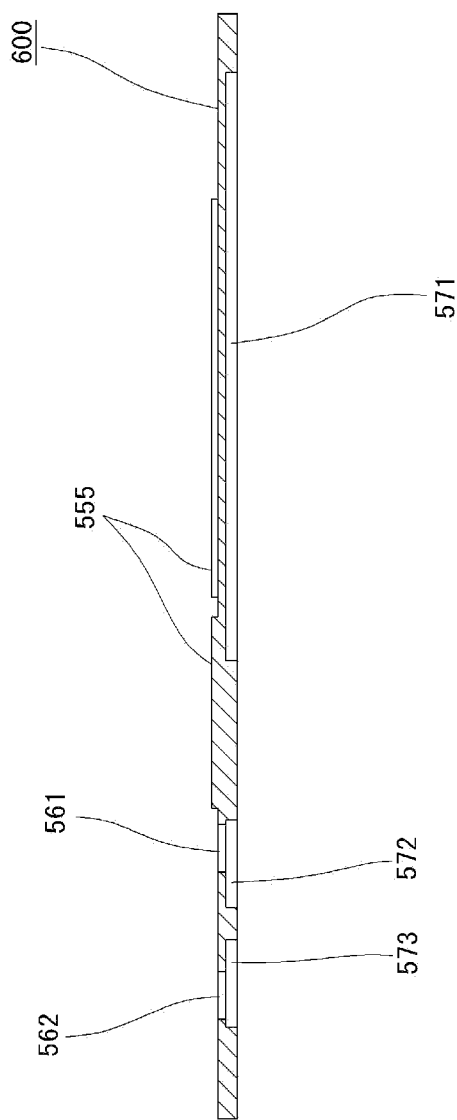
FIG. 26 is a vertical sectional side view illustrating the lower sole plate according to the sixth embodiment.

FIG. 25 and FIG. 26 illustrate an integral configuration. The like components having similar functions to those of the corresponding components described above are expressed by the like reference signs, and their description is omitted.

A lower sole plate 600 as a middle sole plate has an opening 571 in a groove shape, an air release valve mounting aperture 572 and an air intake valve mounting aperture 573 that are formed in a lower surface thereof. An air release connection hole 561 and an air intake connection hole 562 are formed immediately above the valve mounting apertures 572 and 573. Protruded spacers 555 are integrally formed to be protruded on an upper surface of the lower sole plate 600. An outsole plate 580 is placed on the lower surface of this lower sole plate 600 and has a space of an opening 571 serving as a pump chamber P. Such integral configuration of the spacer 555, the first lower sole plate 560, and the second lower sole plate 570 reduces the number of the layered sole plates constituting the sole and simplifies the structure.

The following describes the ventilation function according to the fifth embodiment and the sixth embodiment.

Application of the wearer's weight to the pump chamber P that is configured by vertically parting the opening 571 during walking bends and compresses the pump chamber P. The compressed air flows through the common path 581, presses open the valve element T in the open/close aperture 205b of the air release check valve V2, and flows out from the communication hole 206b. The compressed air then passes through the air release passage L2 including the air release connection hole 561, the connection opening 551a and the openings 531 and 541 and is ejected from the openings 531 toward the lower surface of the toes.

When the shoe is subsequently separated from the ground surface to release the compression of the pump chamber P, the pump chamber P is returned to the flat plate-like shape. This increases the volume of the pump chamber P and provides a negative pressure in the pump chamber P. Accordingly, the valve space becomes a negative pressure through the common path 581 and the communication hole 206a of the air intake check valve V1. The valve element T is then pulled down to be opened, and the dry air in a heel portion flows into the pump chamber P through the air intake passage L1 including the air intake connection hole 562, the connection openings 551b and the openings 532 and 542.

The dried air is ejected toward the lower surface of the toes in the shoe interior 34 by compression of the pump chamber P accompanied with a next walking step. This performs continuous ventilation of the shoe interior 34. The actions between the toes are similar to those described in the first embodiment, and the description is omitted.

According to the fifth embodiment and the sixth embodiment, the check valves V1 and V2 are arranged adjacent to each other in the heel position above the heel 33, which is the strongest in the shoe and is unlikely to be affected by the deformation force. This configuration suppresses the check valves V1 and V2 from being damaged and enhances the durability of the entire ventilation shoe.

The air release check valve V2 may be placed in the plantar arch portion, for example, between the protruded spacer 38a and the cushion member 38c shown in FIG. 7, between the protruded spacer 38a and the cushion member 38d, or immediately below the air release passage L2. In this configuration, no load is applied to the air release check valve V2, so that the air release check valve V2 is not broken.

The following describes a second embodiment of the check valves V1 and V2 of the present disclosure.

Figure 27:
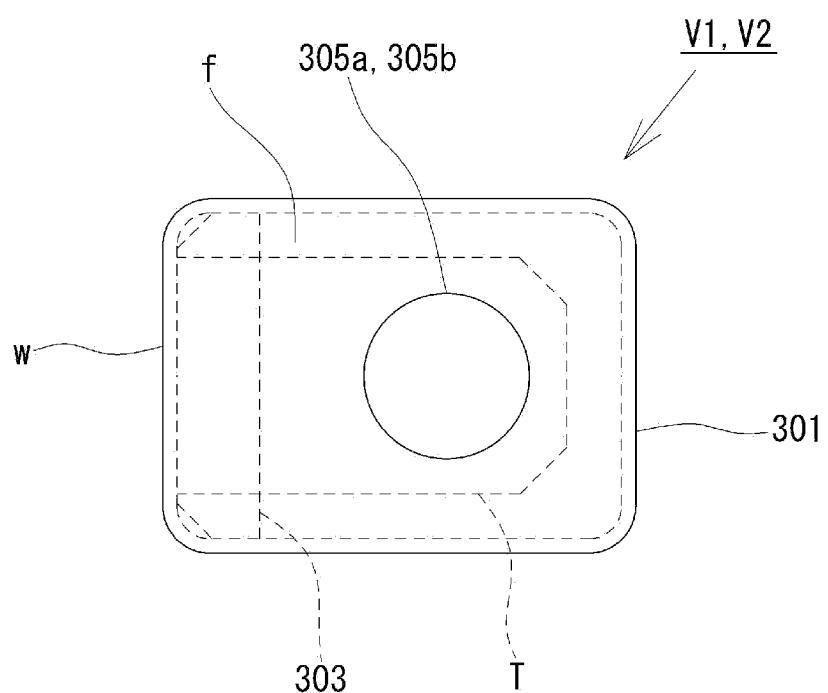
FIG. 27 is a plan view illustrating a second embodiment of the check valves V1 and V2.
Figure 28:
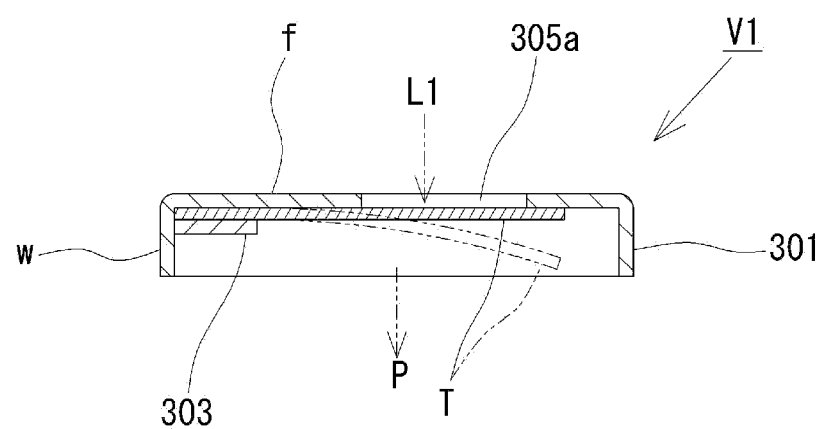
FIG. 28 is a vertical sectional view illustrating the second embodiment used as an air intake check valve V1.
Figure 29:
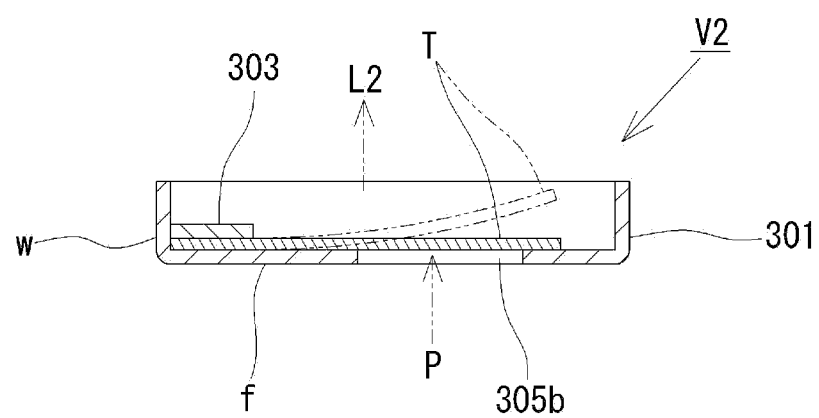
FIG. 29 is a vertical sectional view illustrating the second embodiment used as an air release check valve V2.

FIG. 27 is a plan view, FIG. 28 is a sectional view illustrating the second embodiment used as an air intake check valve V1, and FIG. 29 is a sectional view illustrating the second embodiment used as an air release check valve V2.

The air intake check valve V1 and the air release check valve V2 have identical structures and include an open case 301 that is formed in a thin flat box-like shape, that has its lower surface open and that includes main surface portion f and a surrounding side surface portion w; a valve element T; and a fixation member 303 that is fixed to the open case 301 by an adhesive or the like and that is arranged to press one edge of the valve element T against a rear face of the open case 301 and thereby fix the valve element T. An open/close aperture 305a or 305b is formed as an air inlet in the main surface portion f of the open case 301. This open case 301 is configured as the support member of the present disclosure.

As shown in FIG. 28, the air intake check valve V1 with the open surface of the open case 301 facing down is inserted into an air intake valve mounting aperture 152 (shown in FIG. 1). This forms a valve space inside of the open case 301. In the air intake check valve V1, the outside of an open/close aperture 305a communicates with an air intake passage L1 (shown in FIG. 1), and a lower portion of the valve space (inside of the open/close aperture 305a) communicates with a pump chamber P.

As shown in FIG. 29, the air release check valve V2 with the open surface of the open case 301 facing up is inserted into the air release valve mounting aperture 157. This forms a valve space inside of the open case 301. In the air release check valve V2, the outside of an open/close aperture 305b communicates with the pump chamber P, and an upper portion of the valve space (inside of the open/close aperture 305b) communicates with an air release passage L2.

According to this embodiment, the air intake check valve V1 and the air release check valve V2 have the identical structures. A check valve arranged upside down may be used for either of the air intake check valve V1 and the air release check valve V2. The ventilation device is readily configured by fixing the valve element T to the open case 301 to be integrated and mounting the air intake check valve V1 and the air release check valve V2 to the valve mounting apertures 572 and 573 formed in the sole plates. The valve space is defined by the side surface portion w on the circumference of the open case 301. Matching the outer shape of the open case 301 with the valve mounting apertures 572 and 573 enables the air intake check valve V1 and the air release check valve V2 to be stably held in the valve mounting apertures 572 and 573. This also has the advantages of the less number of components and the simple structure.

The following describes a third embodiment of the check valves V1 and V2 of the present disclosure.

Figure 30:
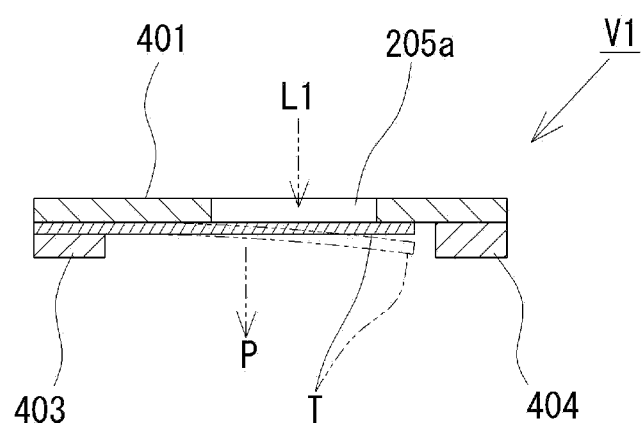
FIG. 30 is a vertical sectional view illustrating a third embodiment used as an air intake check valve V1.
Figure 31:
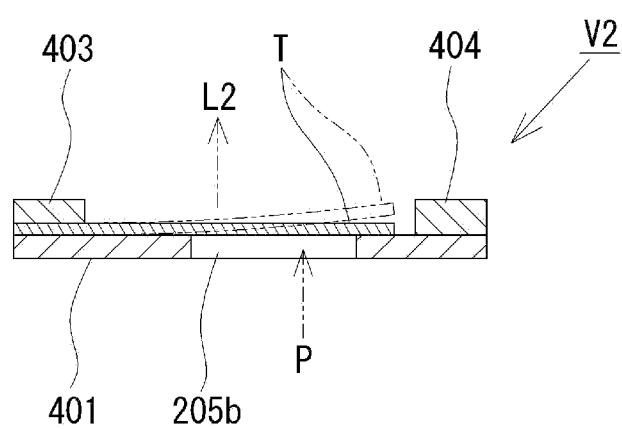
FIG. 31 is a vertical sectional view illustrating the third embodiment used as an air release check valve V2.

FIG. 30 is a sectional view illustrating the third embodiment used as an air intake check valve V1, and FIG. 31 is a sectional view illustrating the third embodiment used as an air release check valve V2.

A check valve V1 or V2 is configured by a plate 401, a valve element T and narrow plate spacers 403 and 404. The valve element T is fixed between the plate 401 and the spacer 403 on one side edge of the plate 401 by an adhesive or the like. The spacer 404 is fixed on the other side end of the plate 401 by an adhesive or the like to be opposed to the other edge of the valve element T. A valve space is formed on the inner side of the spacers 403 and 404 to allow for operation of the valve element T. Additionally, open/close apertures 205a and 205b serving as air inlets are formed in the plate 401. This plate 401 is configured as the support member of the present disclosure.

As shown in FIG. 30, when the check valve is used as the air intake check valve V1, the plate 401 with its rear face (inside of the open/close aperture 205a) facing down is inserted into an air intake valve mounting aperture, so as to form a valve space in a lower portion. The valve space communicates with a pump chamber P, and the open/close aperture 205a communicates with an air intake passage L1.

As shown in FIG. 31, when the check valve is used as the air release check valve V2, the plate with its rear face (inside of the open/close aperture 205b) facing up is inserted into an air release valve mounting aperture, so as to form a valve space in an upper portion. The valve space communicates with an air release passage L2, and the open/close aperture 205b communicates with the pump chamber P.

The ventilation device is readily configured by fixing the valve element T to the plate 401 to be integrated and mounting the air intake check valve V1 and the air release check valve V2 to the valve mounting apertures formed in the sole plates. This has the advantages of the simple structure and easy manufacture.

REFERENCE SIGNS LIST

30 ventilation shoe
31 upper
32 sole
34 shoe interior
37, 570, 600 lower sole plate (middle sole plate)
38, 580 outsole plate
152, 157 valve mounting aperture
205a, 205b open/close aperture
206a, 206b communication hole
201, 301 open case (support member)
202 cover
305a, 305b open/close aperture
401 plate (support member)
405a, 405b open/close aperture
572, 573 valve mounting aperture
L1 air intake passage
L2 air release passage
P pump chamber
V1 air intake check valve
V2 air release check valve
T valve element

The invention claimed is:

1. A ventilation shoe, comprising: an upper, a sole and a ventilation device configured to ventilate air in a shoe interior, the ventilation device comprising:
an air intake passage arranged to communicate with outside air;
an air release passage provided to be open to a sole surface in a neighborhood of a toe position and configured to release the air to the shoe interior;
an air intake check valve provided to communicate with the air intake passage and being flat, and an air release check valve provided to communicate with the air release passage and being flat; and
a pump chamber provided in the sole to be compressed accompanied with stepping of a wearer's foot and feed the air accumulated inside of the pump chamber from the air release passage to the shoe interior via the air release check valve and to be restored accompanied with end of stepping and take in the air from the air intake passage via the air intake check valve, wherein
each of the air intake check valve and the air release check valve comprises:
a support member made of metal or synthetic resin that includes main surface portion with an open/close aperture formed therein; and
a valve element that is made of a thin flexible material, that has one end held on the support member to cover the open/close aperture from an inner side and that is configured, such that application of a pneumatic pressure from outside to the open/close aperture deforms the valve element inward to open the open/close aperture,
the sole is formed by layering a plurality of sole plates, and
the pump chamber is a flat chamber formed from a plantar arch portion in the sole towards a toe portion in the sole and compressed by a motion lifting up of a wearer's heel and standing of toes of the wearer in the stepping, wherein
valve mounting apertures being flat are formed inside of the sole plate that is placed on the another sole plate such as to place the respective check valves therein,
the air intake check valve is inserted in the valve mounting aperture such that outside of the open/close aperture is placed at an upper position,
the air release check valve is inserted in the valve mounting aperture such that outside of the open/close aperture is placed at a lower position,
the air intake check valve is arranged such that outside of the open/close aperture communicates with the air intake passage connecting with the shoe interior and that inside of the open/close aperture communicates with the pump chamber, and
the air release check valve is arranged such that outside of the open/close aperture communicates with the pump chamber and that inside of the open/close aperture communicates with the air release passage.

2. The ventilation shoe according to claim 1, wherein each of the air intake check valve and the air release check valve comprises:
a flat open case that is configured as the support member, that includes a main surface portion and a side surface portion arranged to be continuous with the main surface portion, that forms a valve space inside thereof, and that has the open/close aperture formed in the main surface portion; and the valve element that has one end held in the open case to cover the open/close aperture from the inner side, wherein the air intake check valve is arranged in the sole, such that the open/close aperture communicates with the air intake passage and that the valve space communicates with the pump chamber, and the air release check valve is arranged in the sole, such that the open/close aperture communicates with the pump chamber and that the valve space communicates with air release passage.

3. The ventilation shoe according to claim 2, wherein each of the air intake check valve and the air release check valve comprises:

the flat open case, the valve element arranged to cover the open/close aperture from the inner side, and a cover configured to cover an open surface of the open case, wherein the open case and the cover define the valve space, and the cover has a communication hole formed therein, wherein the air intake check valve is arranged such that the open/close aperture communicates with the air intake passage and that the communication hole communicates with the pump chamber, and the air release valve is arranged such that the open/close aperture communicates with the pump chamber and that the communication hole communicates with the air release passage.

4. The ventilation shoe according to claim 3, wherein the cover includes a main surface portion with the communication hole formed therein and a side surface portion arranged to be continuous with the main surface portion, and the cover is fit in the open case, and the valve element is held by placing one end of the valve element between the open case and the side surface portion of the cover.

5. The ventilation shoe according to claim 4, wherein one end of the valve element is folded perpendicularly to form a folded margin, and one end of the valve element is held by placing the folded margin between the side surface portion of the open case and the side surface portion of the cover.

6. The ventilation shoe according to claim 1, wherein a valve mounting aperture which the air intake check valve is placed in and a valve mounting aperture which the air release check valve is placed in, are formed at a heel position of one middle sole plate that is placed vertically between other sole plates, the air intake check valve is inserted in the valve mounting aperture such that outside of the open/close aperture is placed at an upper position, the air release check valve is inserted in the valve mounting aperture such that outside of the open/close aperture is placed at a lower position, and the pump chamber formed between the sole plates is arranged to communicate with the open/close aperture of the air intake check valve from an inner side and to communicate with the open/close aperture of the air release check valve from an outer side via a common path extended to a lower portion of the check valves.

* * * * *